(12) United States Patent
Kishine et al.

(10) Patent No.: US 11,796,722 B2
(45) Date of Patent: Oct. 24, 2023

(54) OPTICAL ELEMENT, OPTICAL DEVICE, AND IMAGING APPARATUS FOR ACQUIRING MULTISPECTRAL IMAGES

(71) Applicant: FUJIFILM Corporation, Tokyo (JP)

(72) Inventors: Yasunobu Kishine, Saitama (JP); Kazuyoshi Okada, Saitama (JP); Atsushi Kawanago, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/721,332

(22) Filed: Apr. 14, 2022

(65) Prior Publication Data

US 2022/0236463 A1 Jul. 28, 2022

Related U.S. Application Data

(63) Continuation of application No. PCT/JP2020/040064, filed on Oct. 26, 2020.

(30) Foreign Application Priority Data

Oct. 30, 2019 (JP) .................................. 2019-197777

(51) Int. Cl.
*H04N 5/335* (2011.01)
*G02B 5/20* (2006.01)
(Continued)

(52) U.S. Cl.
CPC ............. *G02B 5/201* (2013.01); *G02B 7/006* (2013.01); *G02B 27/288* (2013.01); *H04N 23/55* (2023.01);
(Continued)

(58) Field of Classification Search
CPC ............................. G02B 27/288; G02B 7/006
See application file for complete search history.

(56) References Cited

U.S. PATENT DOCUMENTS 9,086,620 B2 7/2015 Hiramoto et al.
9,118,796 B2 8/2015 Hiramoto et al.
(Continued)

FOREIGN PATENT DOCUMENTS

CN 102474649 5/2012
JP 2004080605 3/2004
(Continued)

OTHER PUBLICATIONS

"International Search Report (Form PCT/ISA/210) of PCTIJP2020/040064," dated Dec. 1, 2020, with English translation thereof, pp. 1-5.
(Continued)

*Primary Examiner* — Gary C Vieaux
(74) *Attorney, Agent, or Firm* — JCIPRNET

(57) ABSTRACT

One embodiment according to the technology of the present disclosure provides an optical element, an optical device, and an imaging apparatus, which can acquire a multispectral image having a good image quality. An optical element according to one aspect of the present invention includes: a frame having a plurality of aperture regions; and a plurality of optical filters that are mounted in the plurality of aperture regions, the plurality of optical filters including at least two types of filters having different wavelength ranges of transmitted light, and centroids of at least two types of aperture regions coincide with each other.

13 Claims, 26 Drawing Sheets

(51) Int. Cl.
  *G02B 7/00* (2021.01)
  *G02B 27/28* (2006.01)
  *H04N 23/55* (2023.01)
  *H04N 25/131* (2023.01)
  *H04N 25/13* (2023.01)

(52) U.S. Cl.
  CPC ......... *H04N 25/131* (2023.01); *H04N 25/135* (2023.01)

(56) References Cited

U.S. PATENT DOCUMENTS

| | | |
|---|---|---|
| 2009/0109307 A1 | 4/2009 | Nishida et al. |
| 2013/0224897 A1 | 8/2013 | Ishioka |
| 2015/0234150 A1* | 8/2015 | Katsunuma ........... G01J 3/2803 348/360 |
| 2016/0154152 A1 | 6/2016 | Moriuchi et al. |
| 2018/0026065 A1 | 1/2018 | Hsieh et al. |
| 2019/0072697 A1 | 3/2019 | Moriuchi et al. |

FOREIGN PATENT DOCUMENTS

| | | |
|---|---|---|
| JP | 2009111615 | 5/2009 |
| JP | 2012247645 A * | 12/2012 |
| JP | 2013057761 | 3/2013 |
| JP | 2013174713 | 9/2013 |
| JP | 2013231746 | 11/2013 |
| JP | 2016102733 | 6/2016 |
| JP | 2016177060 | 10/2016 |
| JP | 6124079 | 5/2017 |
| JP | 2018014476 | 1/2018 |

OTHER PUBLICATIONS

"International Preliminary Report on Patentability (Form PCT/IPEA/409) of PCT/JP2020/040064," completed on May 11, 2021, with English translation thereof, pp. 1-6.

"Office Action of China Counterpart Application", dated Jul. 20, 2023, with Partial English translation thereof, p. 1-p. 10.

* cited by examiner

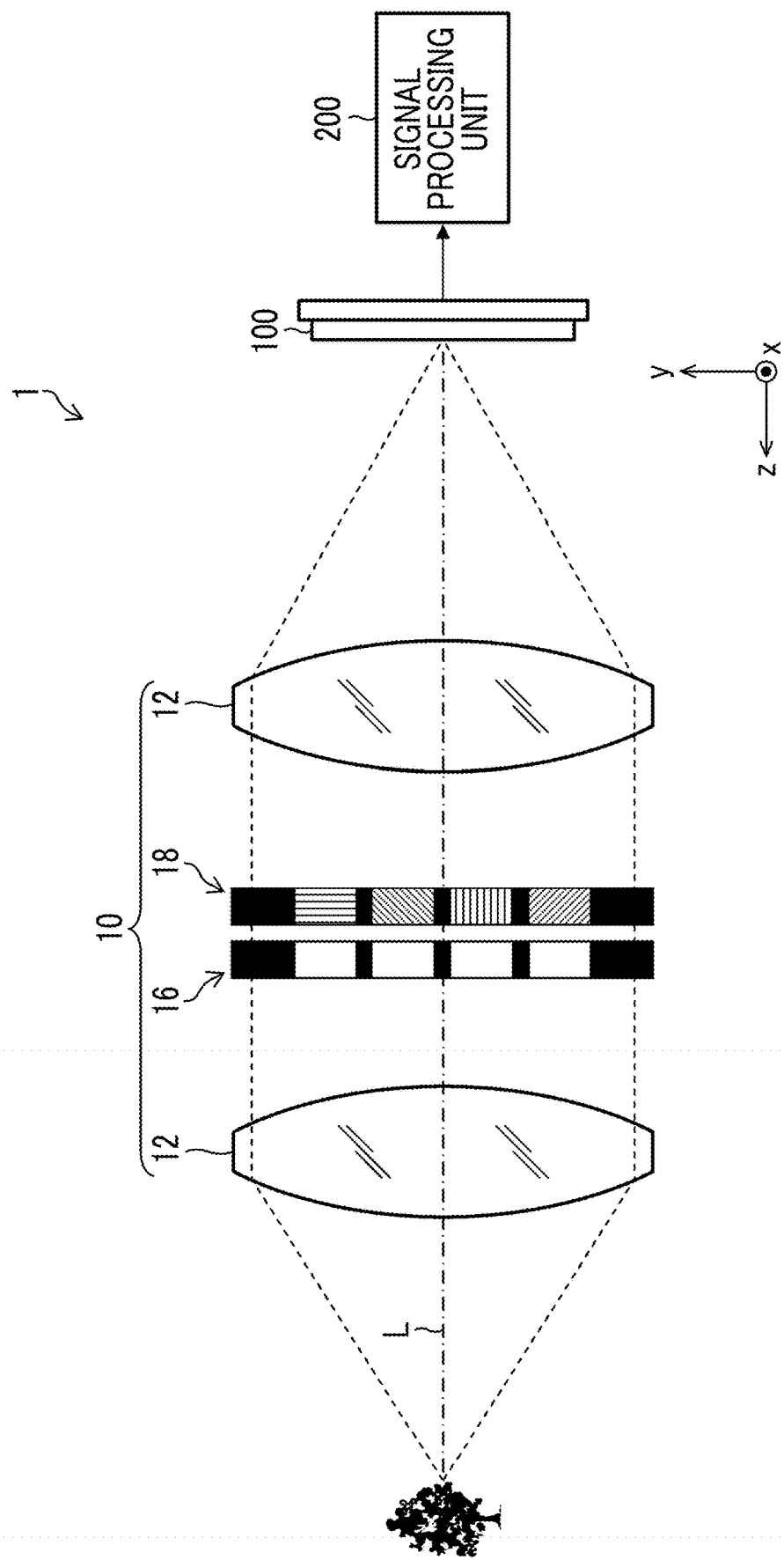

40A 42B  42B 44C  44C 46D  46D

OPTICAL ELEMENT, OPTICAL DEVICE, AND IMAGING APPARATUS FOR ACQUIRING MULTISPECTRAL IMAGES

CROSS-REFERENCE TO RELATED APPLICATIONS

The present application is a Continuation of PCT International Application No. PCT/JP2020/040064 filed on Oct. 26, 2020 claiming priority under 35 U.S.C. § 119(a) to Japanese Patent Application No. 2019-197777 filed on Oct. 30, 2019. Each of the above applications is hereby expressly incorporated by reference, in its entirety, into the present application.

BACKGROUND OF THE INVENTION

1. Field of the Invention

The present invention relates to an optical element, an optical device, and an imaging apparatus, for capturing a multispectral image.

2. Description of the Related Art

JP2016-177060A describes a color wheel having a color filter having a rotationally symmetric disposition, and a projection device using the color wheel. In addition, JP2016-102733A describes a color filter comprising first to third filter regions. The third filter region is disposed symmetrically with respect to the center. In addition, JP6124079B describes a polarizing color filter plate in which a polarizing filter is disposed in a fan-shaped region, and an imaging apparatus comprising the color filter plate. Further, as described in JP2013-57761A, the amount of image deviation increases or decreases depending on the position of the centroid of an aperture.

SUMMARY OF THE INVENTION

One embodiment according to the technology of the present disclosure provides an optical element, an optical device, and an imaging apparatus, which can acquire a multispectral image having a good image quality.

An optical element according to a first aspect of the present invention comprises: a frame having a plurality of aperture regions; and a plurality of optical filters that are mounted in the plurality of aperture regions, the plurality of optical filters including at least two types of filters having different wavelength ranges of transmitted light, in which positions of centroids of the aperture regions are the same for the at least two types of filters.

A second aspect provides the optical element according to the first aspect, in which the centroid is a centroid of an image generated by the aperture region.

A third aspect provides the optical element according to the first or second aspect, in which the plurality of optical filters are mounted in aperture regions having aperture areas corresponding to the wavelength ranges.

A fourth aspect provides the optical element according to the third aspect, in which the plurality of optical filters are mounted such that an optical filter having a longer wavelength at a center of the wavelength range is mounted in an aperture region having a larger aperture area.

A fifth aspect provides the optical element according to any one of the first to fourth aspects, in which the frame has a feature point that coincides with the centroid in a case where the frame is viewed from a front, and the aperture region has a smaller aperture area as a distance from the feature point increases.

A sixth aspect provides the optical element according to any one of the first to fifth aspects, in which for at least one of the wavelength ranges, a plurality of optical filters having the same wavelength range are mounted in the plurality of aperture regions, respectively.

A seventh aspect provides the optical element according to any one of the first to sixth aspects, in which the plurality of aperture regions have different aperture shapes for each of the wavelength ranges of the mounted optical filters, and the plurality of optical filters have different shapes for each wavelength range, the shapes corresponding to the aperture shapes.

An eighth aspect provides the optical element according to any one of the first to seventh aspects, in which at least one set of the plurality of optical filters has two or more types of wavelength ranges in the plurality of aperture regions.

A ninth aspect provides the optical element according to any one of the first to eighth aspects, the optical element further comprising a plurality of polarizing filters having different polarization directions.

A tenth aspect provides the optical element according to the ninth aspect, in which the polarization directions are the same for each wavelength range.

An optical device according to an eleventh aspect comprises: the optical element according to any one of the first to eighth aspects; and a lens that forms an optical image of a subject, in which the optical element is disposed at a pupil position of the lens such that the centroid coincides with an optical axis of the lens.

A twelfth aspect provides the optical device according to the eleventh aspect, the optical device further comprising a plurality of polarizing filters having different polarization directions, in which polarizing filters having the same polarization direction among the plurality of polarizing filters are disposed in the aperture regions in which optical filters having the same wavelength range are mounted.

A thirteenth aspect provides the optical device according to the twelfth aspect, in which at least one of the optical element or the plurality of polarizing filters is inserted into an optical path of light incident on the lens or is retracted from the optical path.

An imaging apparatus according to a fourteenth aspect comprises: the optical device according to any one of the eleventh to thirteenth aspects; an imaging element including a plurality of pixel groups that selectively receive light transmitted through any of the plurality of optical filters; and a signal processing unit that generates a plurality of images corresponding to the wavelength ranges of the plurality of optical filters, respectively, based on a signal output from the imaging element.

A fifteenth aspect provides the imaging apparatus according to the fourteenth aspect, in which the imaging element comprises, on a pixel, a plurality of types of optical filters having different transmission wavelength ranges and a plurality of types of polarization portions having different transmission polarization directions.

BRIEF DESCRIPTION OF THE DRAWINGS

FIG. 1 is a diagram showing a schematic configuration of an imaging apparatus according to a first embodiment.

DESCRIPTION OF THE PREFERRED EMBODIMENTS

Figure 2A:
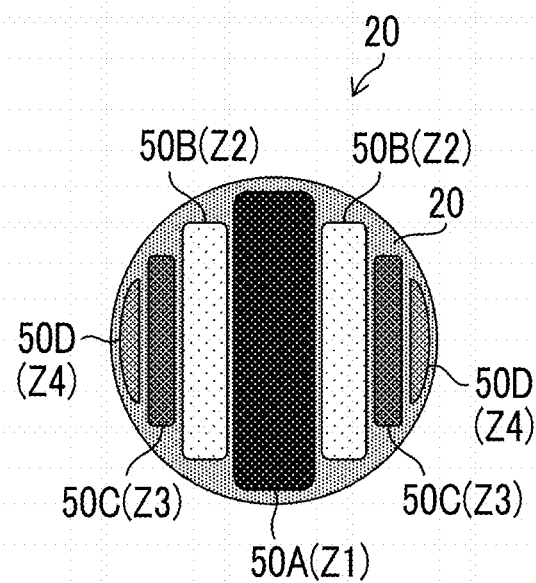
FIGS. 2A and 2B are front views showing a configuration of a bandpass filter unit.

An optical element, an optical device, and an imaging apparatus according to one embodiment of the present invention are as follows. In the description, the accompanying drawings will be referred to as needed.

First Embodiment

<Configuration of Imaging Apparatus>

FIG. 1 is a diagram showing a schematic configuration of an imaging apparatus according to a first embodiment. An imaging apparatus 1 according to the first embodiment is an imaging apparatus that captures a multispectral image of four bands, and mainly comprises an imaging optical system 10 (optical device), an imaging element 100, and a signal processing unit 200.

<Imaging Optical System>

The imaging optical system 10 is configured by a plurality of combinations of lenses 12 (lenses) that form an optical image of a subject, and has a bandpass filter unit 16 (optical element) and a polarizing filter unit 18 (polarizing filter) in an optical path thereof. The bandpass filter unit 16 and the polarizing filter unit 18 are disposed in an optical path of light transmitted through the lens 12 (for example, at a pupil position or its vicinity) in a state in which an optical axis L of the lens 12 and optical axes of the bandpass filter unit 16 and of the polarizing filter unit 18 coincide with each other (a state in which a centroid 19G of a frame 19 and a centroid 20G of a frame 20 and an optical axis L of the lens 12 coincide with each other). In addition, the imaging optical system 10 includes a focus adjustment mechanism (not shown). The focus adjustment mechanism adjusts the focus by moving a focus lens included in the imaging optical system 10 back and forth along the optical axis L.

<Configuration of Bandpass Filter Unit>

Figure 2B:
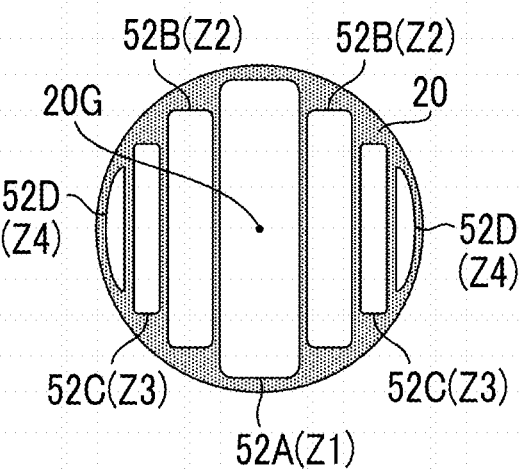

FIGS. 2A and 2B are front views of the bandpass filter unit 16. As shown in FIG. 2A, the bandpass filter unit 16 comprises a frame 20 (frame) and bandpass filters 50A to 50D (optical filters). The bandpass filters 50A to 50D are mounted in aperture regions 52A to 52D (a plurality of aperture regions; see FIG. 2B) formed in the frame 20, respectively. Aperture regions 52B to 52D are each composed of a plurality of (two) apertures, and bandpass filters 50B to 50D having the same wavelength range of transmitted light are mounted in the aperture regions 52B to 52D, respectively. Further, for the bandpass filters 50A to 50D, the centroid of the aperture regions 52B to 52D coincides with the centroid 20G of the frame 20.

In the first embodiment, the wavelength ranges of the transmitted light of the bandpass filters 50A to 50D can be near infrared, red, green, and blue, respectively. That is, the bandpass filters 50A to 50D include at least two types of filters having different wavelength ranges of transmitted light. The wavelength range of the transmitted light of the bandpass filter is not limited to the above combination, and the wavelength range can be selected according to the spectrum in which the image is to be acquired.

The bandpass filters 50A to 50D described above each transmit light having one type of wavelength, but at least one set of the bandpass filters may have two or more types of wavelength ranges. Among the plurality of bandpass filters, at least one set of bandpass filters may have two or more types of wavelength ranges. Here, "one set" is a combination that the centroid of the aperture regions 52B to 52D coincides with the centroid 20G, and is, for example, a bandpass filter 50B. In a case where the centroid 20G has an aperture region, one set is, for example, a bandpass filter 50A. Further, "having two or more types of wavelength ranges" means that there are two or more types of wavelength ranges to be transmitted, and, for example, a case where two types of wavelength ranges of red and blue are transmitted in the bandpass filter 50B is applicable.

As shown in FIG. 2B, the frame 20 has a plurality of aperture regions 52A to 52D. The aperture region 52A is a single aperture region surrounding the centroid 20G of the frame 20, and the aperture regions 52B to 52D are a plurality of aperture regions arranged symmetrically with respect to the centroid 20G of the frame 20. Specifically, the two aperture regions 52B are arranged symmetrically with respect to the centroid 20G (feature point), the two aperture regions 52C are arranged symmetrically with respect to the centroid 20G, and the two aperture regions 52D are arranged symmetrically with respect to the centroid 20G.

Further, the positions of the centroids of the aperture regions 52A to 52D (for the aperture regions having a plurality of apertures such as the aperture regions 52B to 52D, the centroids of all the plurality of apertures) are the same. However, the positions of the centroids may not match for all the aperture regions, and it is sufficient that the positions of the centroids match for at least two types of aperture regions. Further, in a case where the frame 20 is viewed from the front, the centroid of the image generated corresponding to the aperture region coincides with the centroid (feature point) of the aperture region. The centroid of the image generated corresponding to the aperture region refers to the in-focus position located on the optical axis of the imaging optical system.

The bandpass filters 50A to 50D are mounted in an aperture region having an aperture area corresponding to the wavelength range of transmitted light. That is, a bandpass filter having a longer wavelength at the center of the wavelength range is mounted in an aperture region having a larger aperture area. Further, the bandpass filters 50A to 50D are mounted such that a bandpass filter mounted farther from the centroid 20G of the frame 20 is mounted in the aperture region having a narrower aperture area. The aperture area of these aperture regions becomes smaller as the distance from the centroid (which coincides with the centroid of the subject image in a case where the frame is viewed from the front), which is a feature point of the frame, increases.

In the first embodiment, the aperture regions 52A to 52D have a larger aperture area in the order of the aperture regions 52A to 52D. Further, the aperture region 52A has the shortest distance from the centroid 20G (distance between the centroid of the aperture region and the centroid 20G) (distance is zero), and thereafter, the aperture regions 52B to 52D are farther from the centroid 20G in this order. Therefore, the bandpass filter 50A (for near-infrared light) having the longest wavelength in the center of the wavelength range of the transmitted light is mounted in the aperture region 52A having the widest aperture area and the shortest distance from the centroid 20G. Similarly, the bandpass filters 50B (for red light), 50C (for green light), and 50D (for blue light) are respectively mounted in the aperture regions 52B to 52D, which are far from the centroid 20G and which have a narrow aperture area.

<Configuration of Polarizing Filter Unit>

Figure 3A:
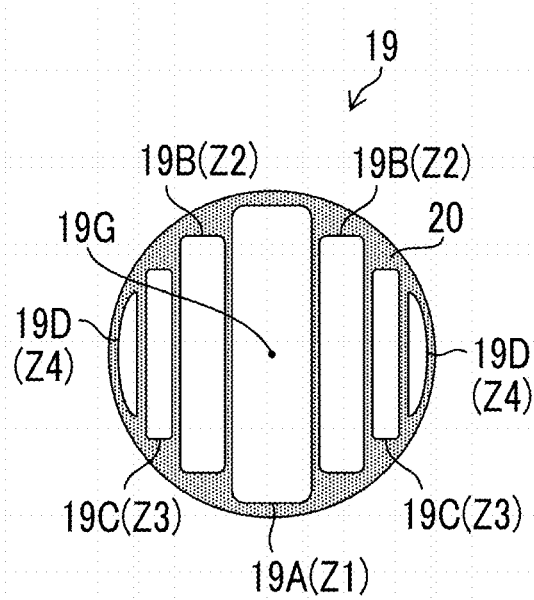
FIGS. 3A and 3B are front views showing a configuration of a polarizing filter unit.
Figure 3B:
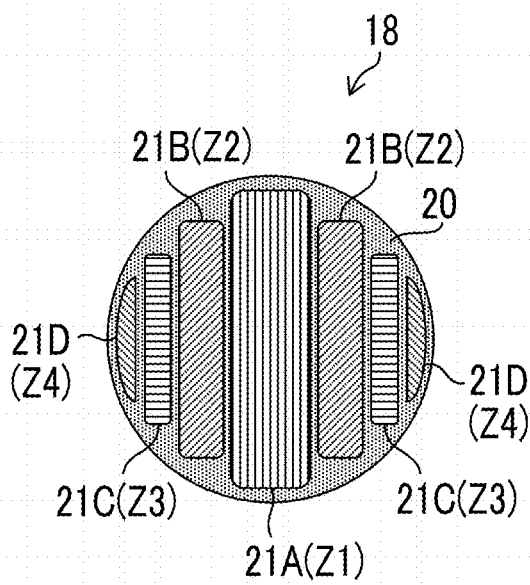

FIGS. 3A and 3B are front views of the polarizing filter unit 18. At least one of the bandpass filter unit or the polarizing filter unit 18 described above is inserted into the optical path of light incident on the lens 12 (imaging optical system 10) or is retracted from the optical path by an operation mechanism (not shown). The polarizing filter unit 18 has a frame 19 having a centroid 19G as a centroid, and the frame 19 has aperture regions 19A to 19D having a position, a size, and a shape corresponding to the above-mentioned aperture regions 52A to 52D (see FIG. 3A).

Similarly to the above-mentioned aperture regions 52A to 52D, the aperture region 19A is a single aperture region surrounding the centroid 19G of the frame 19, and the aperture regions 19B to 19D are a plurality of aperture regions arranged symmetrically with respect to the centroid 19G. Further, polarizing filters 21A to 21D are mounted in the aperture regions 19A to 19D (see FIG. 3B). The polarizing filters 21A to 21D are a plurality of polarizing filters having different polarization directions. Assuming that the polarization directions (polarization angles) in the aperture regions 19A to 19D are $\theta 1$ to $\theta 4$, respectively, for example, $\theta 1=0$ deg, $\theta 2=45$ deg, $\theta 3=90$ deg, and $\theta 4=135$ deg can be satisfied.

The polarizing filters having the same polarization direction among the plurality of polarizing filters 21A to 21D are disposed in the aperture regions in which bandpass filters having the same wavelength range are mounted. Specifically, the two polarizing filters 21B (both polarization directions are the same at 45 deg) are mounted in the two aperture regions 19B corresponding to the two aperture regions 52B (where the bandpass filter 50B is mounted). Further, the two polarizing filters 21C (both polarization directions are the same at 90 deg) are mounted in the two aperture regions 19C corresponding to the two aperture regions 52C (where the bandpass filter 50C is mounted). Further, the two polarizing filters 21D (both polarization directions are the same at 135 deg) are mounted in the two aperture regions 19D corresponding to the two aperture regions 52D (where the bandpass filter 50D is mounted). That is, the polarization direction is the same for each wavelength range.

<Pupil Division>

In the imaging optical system 10, a pupil region is divided into four pupil regions Z1 to Z4 (see FIGS. 2A to 3B) by the bandpass filter unit 16 and the polarizing filter unit 18 having the above-described configuration (pupil division). The pupil region Z1 corresponds to the bandpass filter 50A, the aperture region 52A, the aperture region 19A, and the polarizing filter 21A. The pupil region Z2 corresponds to the bandpass filter 50B, the aperture region 52B, the aperture region 19B, and the polarizing filter 21B. The pupil region Z3 corresponds to the bandpass filter 50C, the aperture region 52C, the aperture region 19C, and the polarizing filter 21C. The pupil region Z4 corresponds to the bandpass filter 50D, the aperture region 52D, the aperture region 19D, and the polarizing filter 21D.

<Image Shift at Time of Defocus in Related Art>

Figure 28A:
FIGS. 28A to 28D are diagrams showing a state of image shift at the time of defocus in the related art.
Figure 28B:
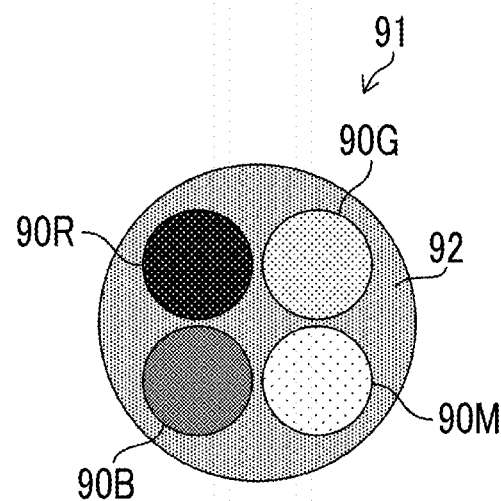

Here, the image shift at the time of defocus in the related art will be described. Consider a case where a subject 90 (shape of the letter "A") shown in FIG. 28A is imaged by a bandpass filter unit 91 shown in FIG. 28B and an imaging optical system (not shown). The bandpass filter unit 91 is a filter unit in which four bandpass filters 90R, 90G, 90M, and 90B having different transmission wavelength ranges are mounted on a frame 92.

Figure 28C:
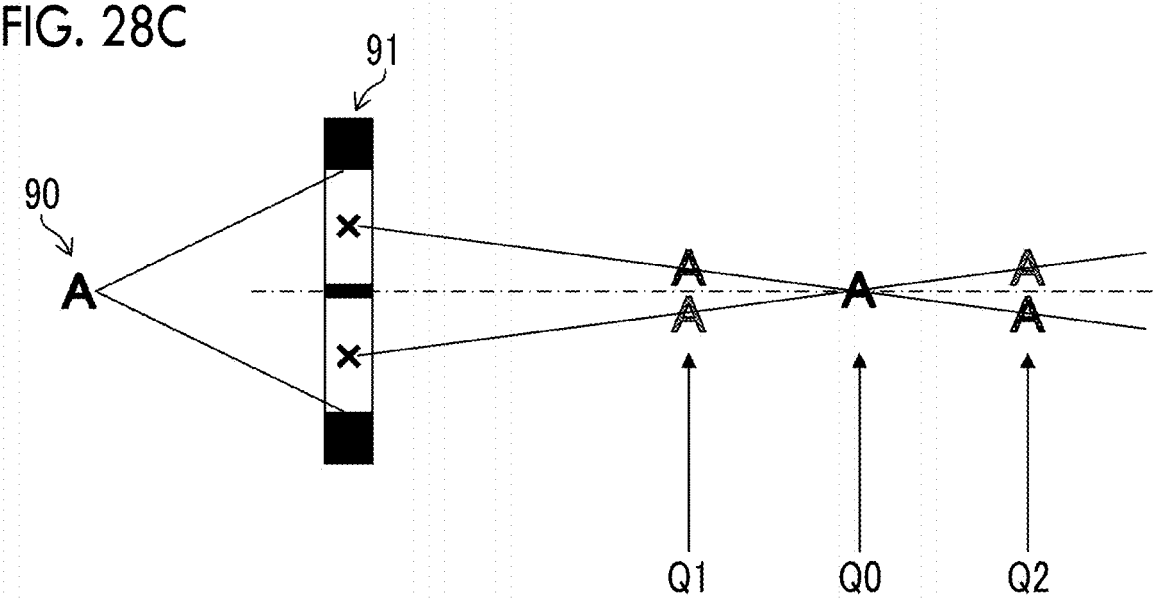
Figure 28D:
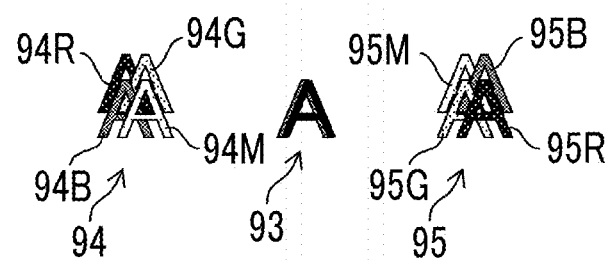

As shown in FIG. 28C, the position where the subject 90 is in focus on the optical axes of the bandpass filter unit 91 and of the imaging optical system is defined as a point Q0, the position closer to the subject 90 than the point Q0 is defined as a point Q1, and the position farther from the subject 90 than the point Q0 is defined as a point Q2. In this case, as shown in FIG. 28D, the image shift does not occur at the point Q0 as in a subject image 93. On the other hand, in a subject image 94 at the point Q1, four subject images 94R, 94G, 94M, and 94B with image shifts are generated corresponding to the transmission wavelength ranges of the bandpass filters 90R, 90G, 90M, and 90B. Similarly, in a subject image 95 at the point Q2, four subject images 95R, 95G, 95M, and 95B with image shifts are generated corresponding to the transmission wavelength ranges of the bandpass filters 90R, 90G, 90M, and 90B (the direction of the shift is opposite to that of the subject image 94). However, the related art has not suppressed such image shift at the time of defocus.

<Effect of Area and Disposition of Aperture Region>

Here, the relationship between the shape, disposition, and arrangement of the aperture region and the defocus and the image shift will be described. Specifically, the results of a simulation assuming that a subject (an object having the shape of the letter "A" and a point light source) is imaged using various apertures and an imaging optical system (not shown) will be described.

<Case 1: In Case of Aperture without Centroid Shift>

Figure 4:
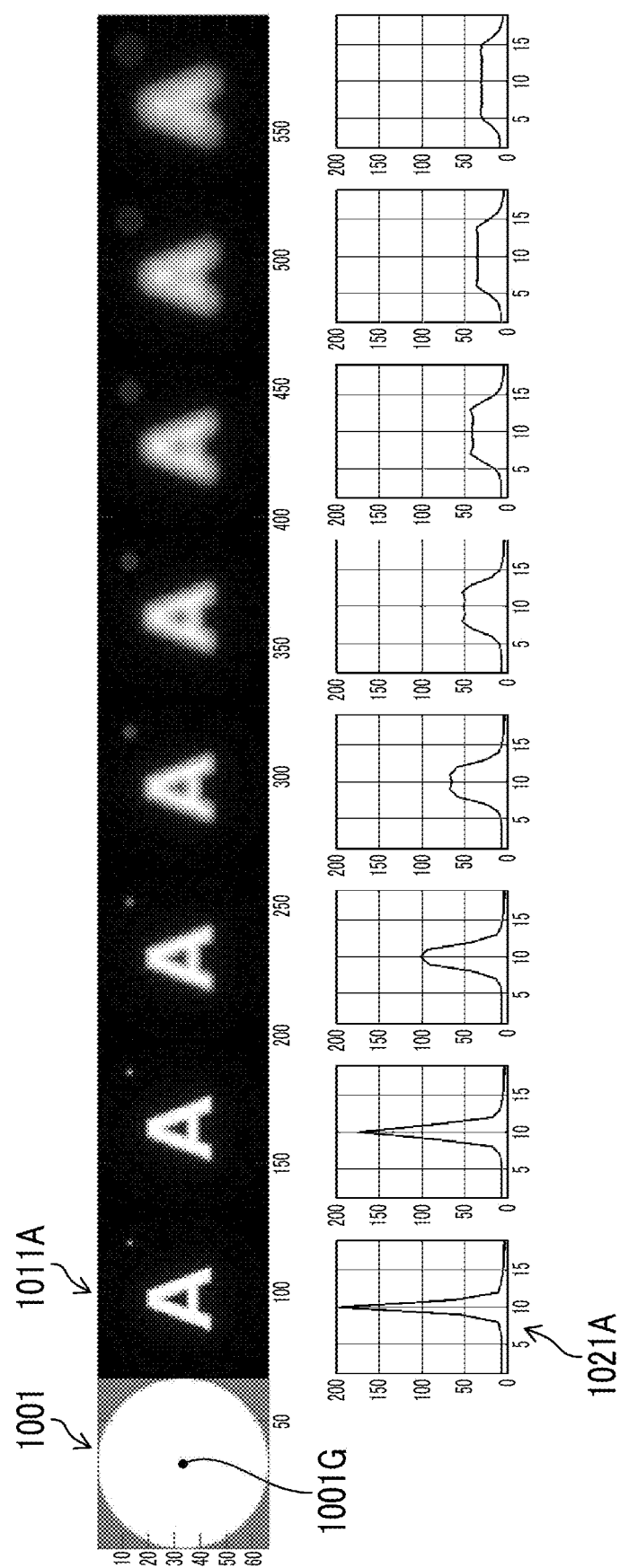
FIG. 4 is a diagram showing a relationship between an aperture shape and an image quality at the time of defocus.

FIG. 4 is a diagram showing results in a case where an aperture 1001 is used. The aperture 1001 is circular, and a centroid 1001G of the aperture 1001 exists on the optical axis of the imaging optical system. In the upper part of FIG. 4, the part with reference numeral 1011A indicates a subject image in an in-focus state (images of the above-mentioned object and point light source, the upper right part is the image of the point light source; the same in Case 1 to Case 9), and indicates the subject image at positions progressively farther away from an in-focus position (positions on the optical axis of the imaging optical system) toward the right side in FIG. 4. The subject image becomes blurred (defocused) as the distance from the in-focus position increases. Meanwhile, the lower part of FIG. 4 is a graph showing a brightness distribution of the image of the point light source at the same positions as those in the upper part of FIG. 4. For example, the part with reference numeral 1021A is a graph at the same position (in-focus position) as that of reference numeral 1011A. As the distance from the in-focus position increases, the brightness distribution becomes wider and gentler.

<Case 2: In Case of Aperture with Centroid Shift>

Figure 5:
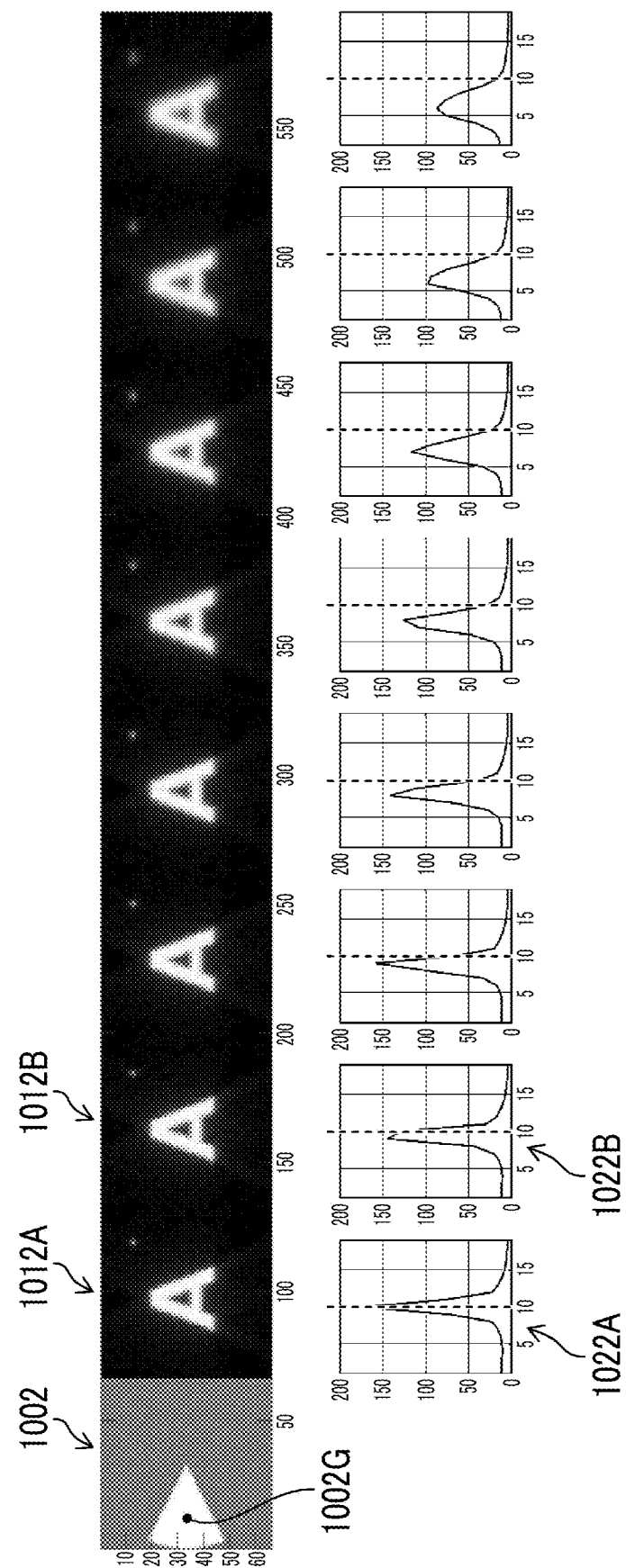
FIG. 5 is another diagram showing a relationship between an aperture shape and an image quality at the time of defocus.

FIG. 5 is a diagram showing results in a case where an aperture 1002 is used. The aperture 1002 is fan-shaped, and a centroid 1002G of the aperture 1002 is offset from the optical axis of the imaging optical system. In such a case, the subject image shifts according to the defocus. For example, the peak of brightness shifts to the left side in FIG. 5 (graph of reference numeral 1022B), just by being slightly offset from the in-focus state (indicated by reference numerals 1012A and 1022A) as in reference numeral 1012B. The peak of brightness in the in-focus state is indicated by a dotted line in the graph (same in the following cases).

<Case 3: In Case of Plurality of Apertures with Centroid Aligned (Aperture Size: Medium)>

Figure 6:
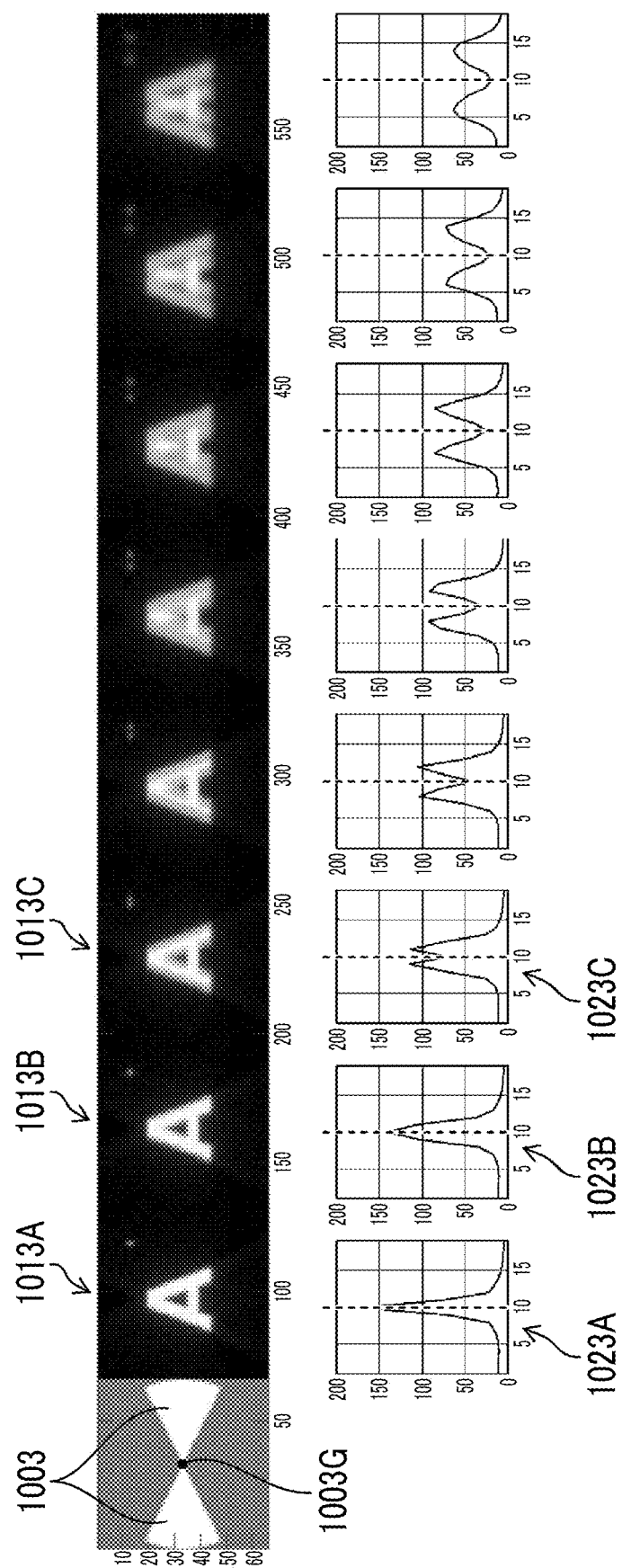
FIG. 6 is still another diagram showing a relationship between an aperture shape and an image quality at the time of defocus.

FIG. 6 is a diagram showing results in a case where apertures 1003 are used. The apertures 1003 are formed of two fan-shaped regions, and a centroid 1003G of the apertures 1003 exists on the optical axis of the imaging optical system. In such a case, the subject image does not shift in a state (reference numerals 1013B and 1023B) of being slightly offset from the in-focus state (reference numerals 1013A and 1023A). However, in a case where the deviation from the in-focus state becomes large (the states on the right sides of reference numerals 1013C and 1023C), the subject image shifts corresponding to each of the two regions of the aperture 1003, and the subject image becomes doubled (which corresponds to a state in which two peaks of brightness occur).

<Case 4: In Case of Plurality of Apertures with Centroid Aligned (Aperture Size: Small)>

Figure 7:
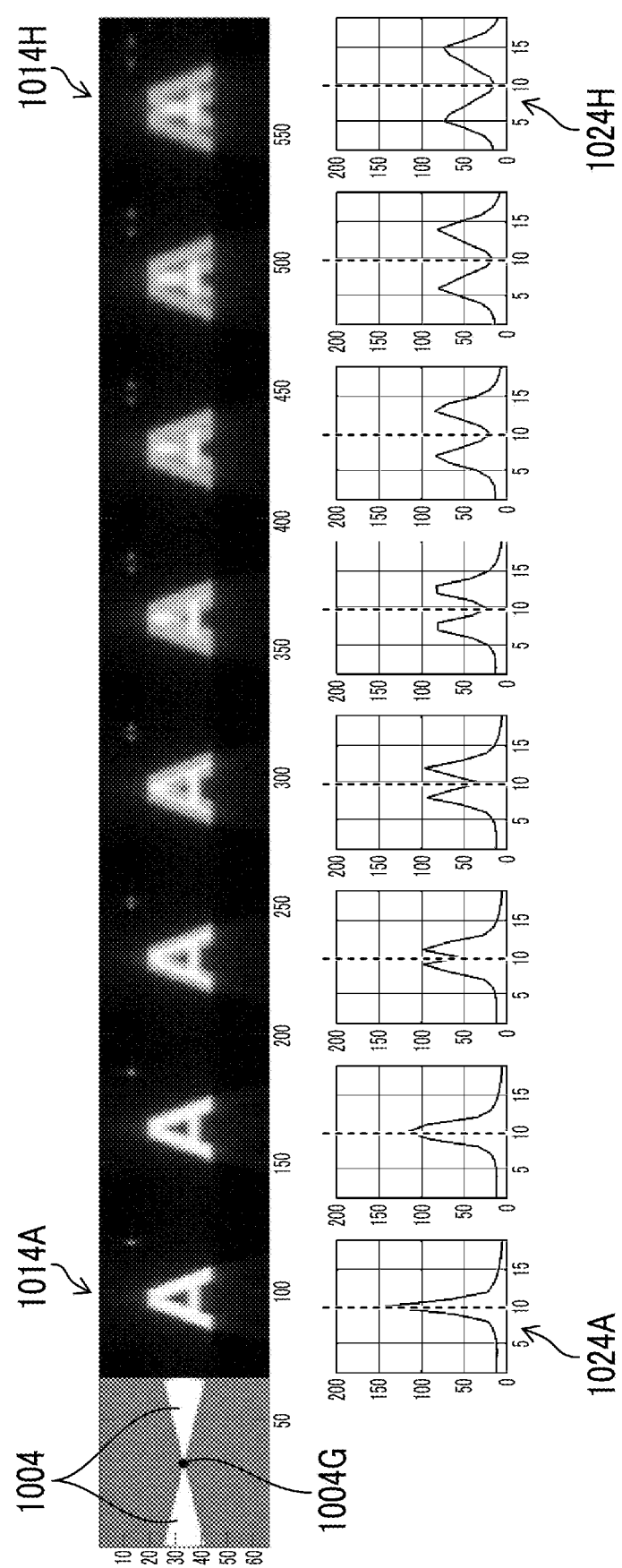
FIG. 7 is still another diagram showing a relationship between an aperture shape and an image quality at the time of defocus.

FIG. 7 is a diagram showing results in a case where apertures 1004 are used. The apertures 1004 are formed of two fan-shaped regions like the aperture 1003 shown in FIG. 6, and a centroid 1004G of the apertures 1004 exists on the optical axis of the imaging optical system, but the aperture area is narrower than that of the aperture 1003. In such a case, the subject image in a state of being offset from the in-focus state (indicated by reference numerals 1014A and 1024A) shifts while a clear state is maintained as compared with Case 3. For example, even at a position farthest from the in-focus state (indicated by reference numerals 1014H and 1024H), the subject image (upper part of FIG. 7) is clearer than that of Case 3, and the peak is clear even in the brightness graph.

<Case 5: In Case of Plurality of Vertical Apertures (Aperture Size: Large)>

Figure 8:
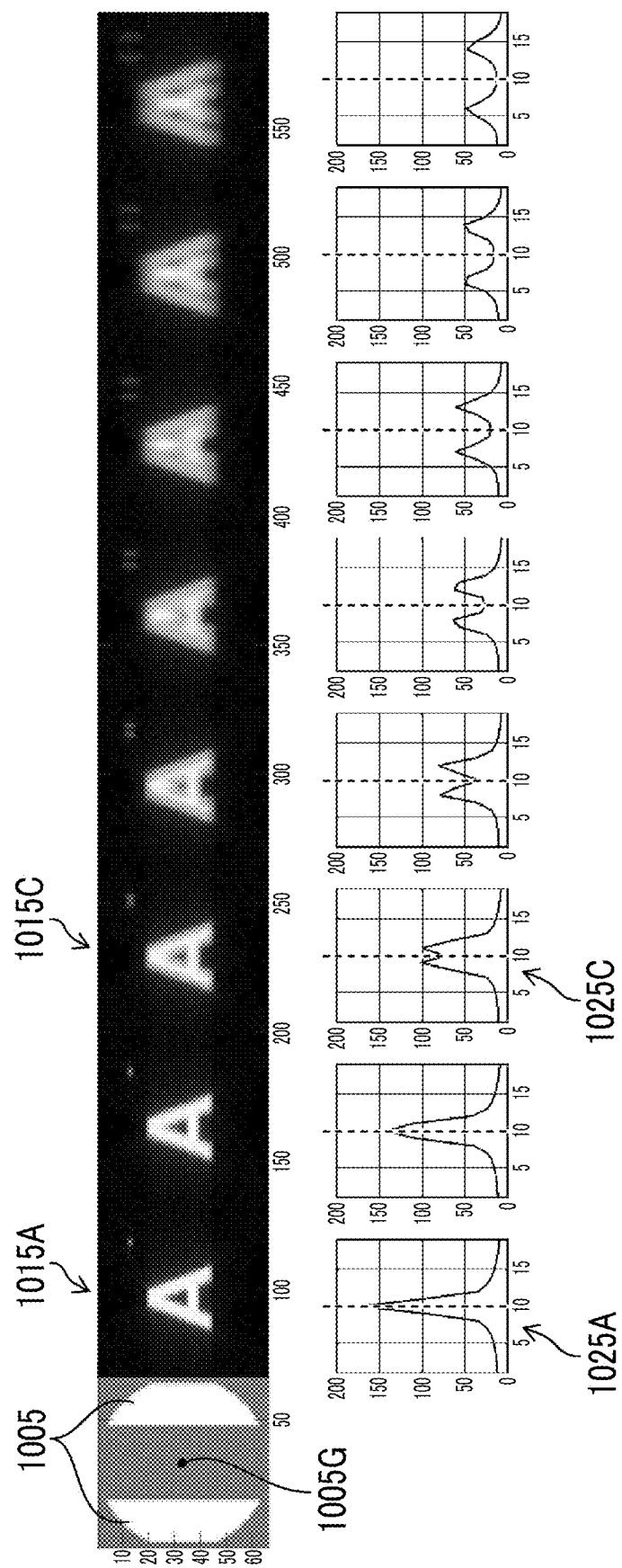
FIG. 8 is still another diagram showing a relationship between an aperture shape and an image quality at the time of defocus.

FIG. 8 is a diagram showing results in a case where apertures 1005 are used. The apertures 1005 are formed of two vertical regions extending in the vertical direction in the figure, and a centroid 1005G of the apertures 1005 exists on the optical axis of the imaging optical system. Even in the case of such apertures, similarly to the case of the two fan-shaped apertures (Case 3 and Case 4), the subject image shifts (according to the defocus) as the distance from the in-focus state (indicated by reference numerals 1015A and 1025A) increases, and a double image is generated in the state on the right side of the states indicated by reference numerals 1015C and 1025C.

<Case 6: In Case of Plurality of Vertical Apertures (Aperture Size: Medium)>

Figure 9:
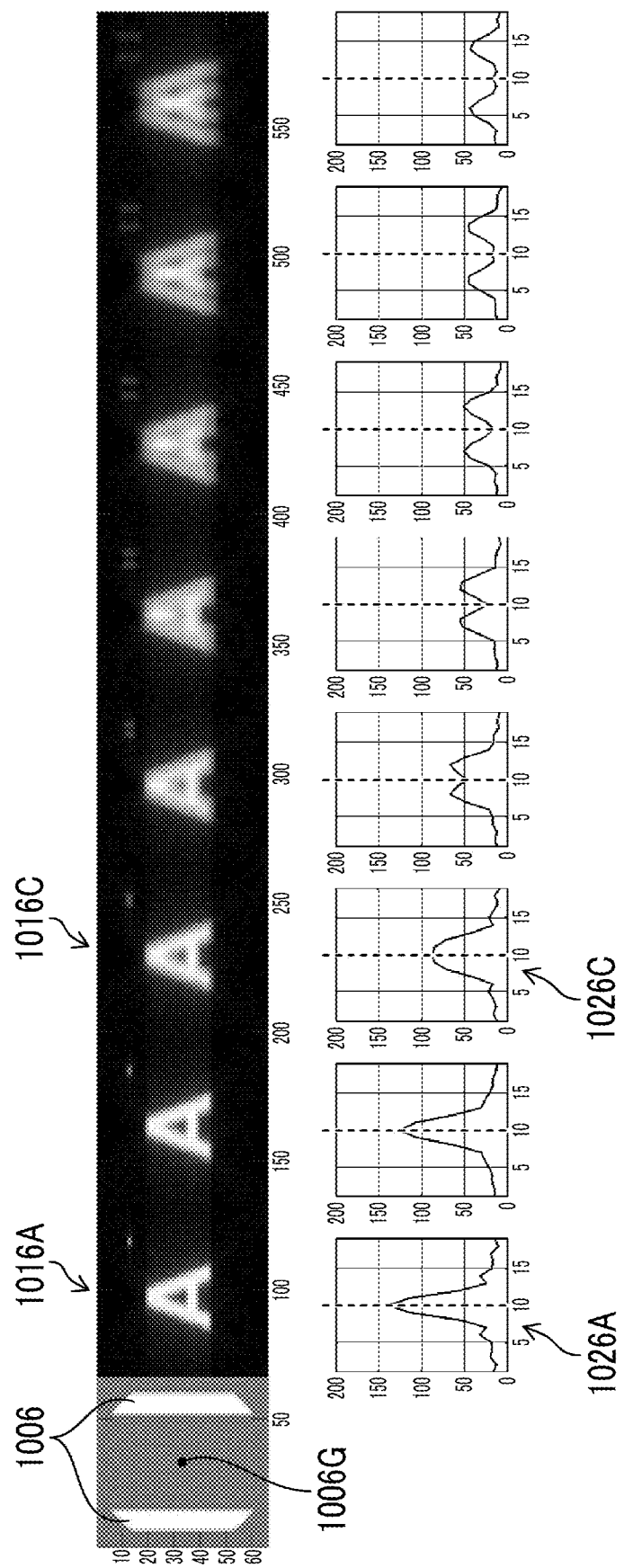
FIG. 9 is still another diagram showing a relationship between an aperture shape and the image quality at the time of defocus.

FIG. 9 is a diagram showing results in a case where apertures 1006 are used. Similarly to the aperture 1005 in Case 5, the apertures 1006 are formed of two vertical regions extending in the vertical direction in FIG. 9, and a centroid 1006G of the apertures 1006 exists on the optical axis of the imaging optical system, but the aperture area is narrower than that of the aperture 1005. Even in the case of such apertures, the subject image shifts as the distance from the in-focus state (indicated by reference numerals 1016A and 1026A) increases, but the degree of duality of the subject image is reduced as compared with the case of Case 5. For example, a double image is generated in the state indicated by reference numerals 1015C and 1025C of Case 5 (see FIG. 8), but in a state corresponding to this in Case 6 (the deviation from the in-focus state is the same; in FIG. 9, the state indicated by reference numerals 1016C and 1026C), the double image is not generated (the peak of the brightness graph is one).

<Case 7: In Case of Plurality of Vertical Apertures (Aperture Size: Small)>

Figure 10:
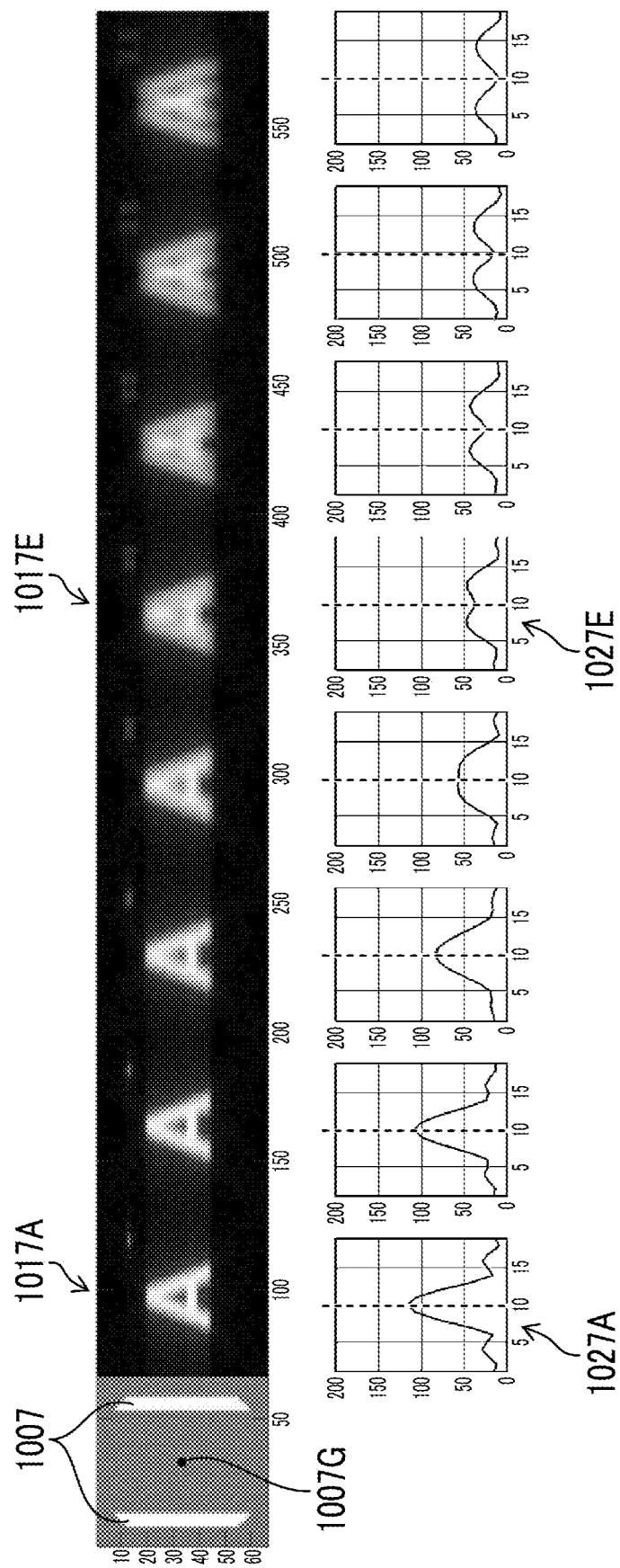
FIG. 10 is still another diagram showing a relationship between an aperture shape and an image quality at the time of defocus.

FIG. 10 is a diagram showing results in a case where apertures 1007 are used. Similarly to the above-mentioned apertures 1005 and 1006, the apertures 1007 are formed of two vertical regions extending in the vertical direction in FIG. 10, and a centroid 1007G of the apertures 1007 exists on the optical axis of the imaging optical system, but the aperture area is narrower than those of the apertures 1005 and 1006. Even in the case of such apertures, the subject image shifts as the distance from the in-focus state (indicated by reference numerals 1017A and 1027A) increases, but the degree of duality of the subject image is further reduced as compared with the case of Case 5 and Case 6. Specifically, the double image is generated in Case 7 on the right side (the state in which the focus is further offset) of the state indicated by reference numerals 1017E and 1027E.

<Case 8: In Case of Vertical Apertures Moved to Center Portion (Aperture Size: Medium)>

Figure 11:
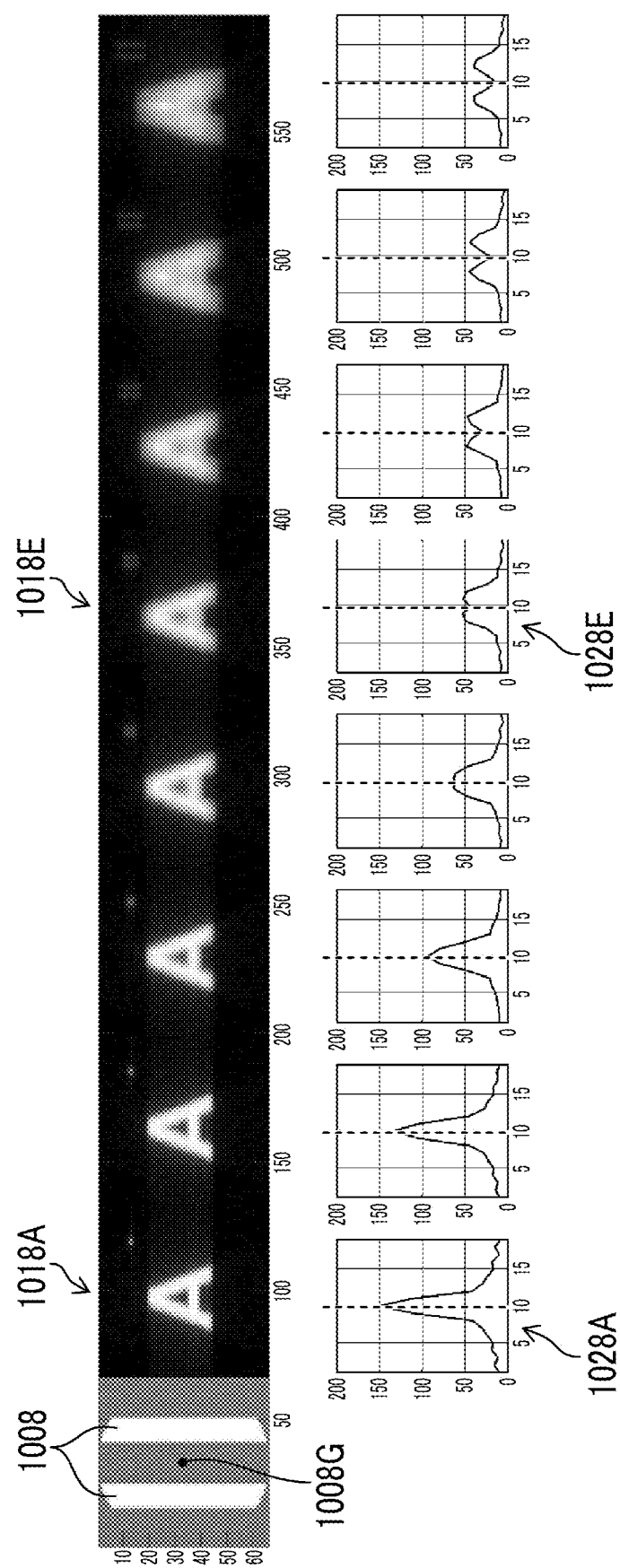
FIG. 11 is still another diagram showing a relationship between an aperture shape and an image quality at the time of defocus.

FIG. 11 is a diagram showing results in a case where apertures 1008 are used. The apertures 1008 have the same shape and size as the apertures 1006 in Case 6, but the two apertures are disposed closer (closer to a centroid 1008G) than in Case 6. Even in the case of such apertures, the subject image shifts as the distance from the in-focus state (indicated by reference numerals 1018A and 1028A) increases, but the degree of duality of the subject image is reduced as compared with the case of Case 6. Specifically, the double image is generated in Case 8 on the right side (the state in which the focus is further offset) of the state indicated by reference numerals 1018E and 1028E.

<Case 9: In Case of Single Vertical Aperture Disposed in Center Portion>

Figure 12:
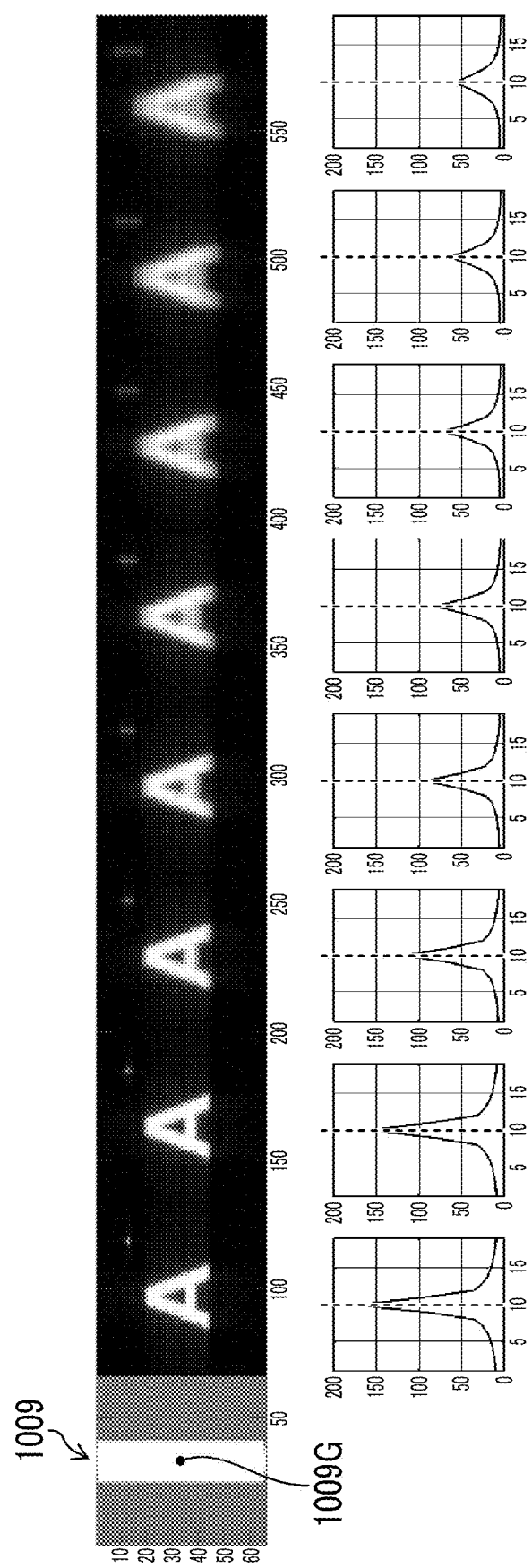
FIG. 12 is still another diagram showing a relationship between an aperture shape and an image quality at the time of defocus.

FIG. 12 is a diagram showing results in a case where an aperture 1009 is used. The aperture 1009 is a single aperture with a centroid 1009G that coincides with the center of the optical axis of the imaging optical system. In the case of such an aperture, similarly to the case of the aperture 1001 of Case 1, the subject image does not shift even at a position away from the in-focus state, and thus the double image is not generated.

<Summary of Case 1 to Case 9>

As can be seen from Case 1 to Case 9, by increasing the aperture for the center portion of the lens (the portion close to the optical axis of the imaging optical system) and reducing the aperture at the peripheral portion, it is possible to suppress the shift of the subject image and the generation of the double image in a wide defocus range (at a position where the degree of deviation from the in-focus state is large). In the optical element, the imaging optical system, and the imaging apparatus according to the embodiment of the present invention, the shape, size, and disposition of the aperture are set in consideration of the above point, and thus it is possible to suppress subject image shift (image shift) at the time of defocus, and to acquire a multispectral image with a good image quality.

<Configuration of Imaging Element>

Figure 13:
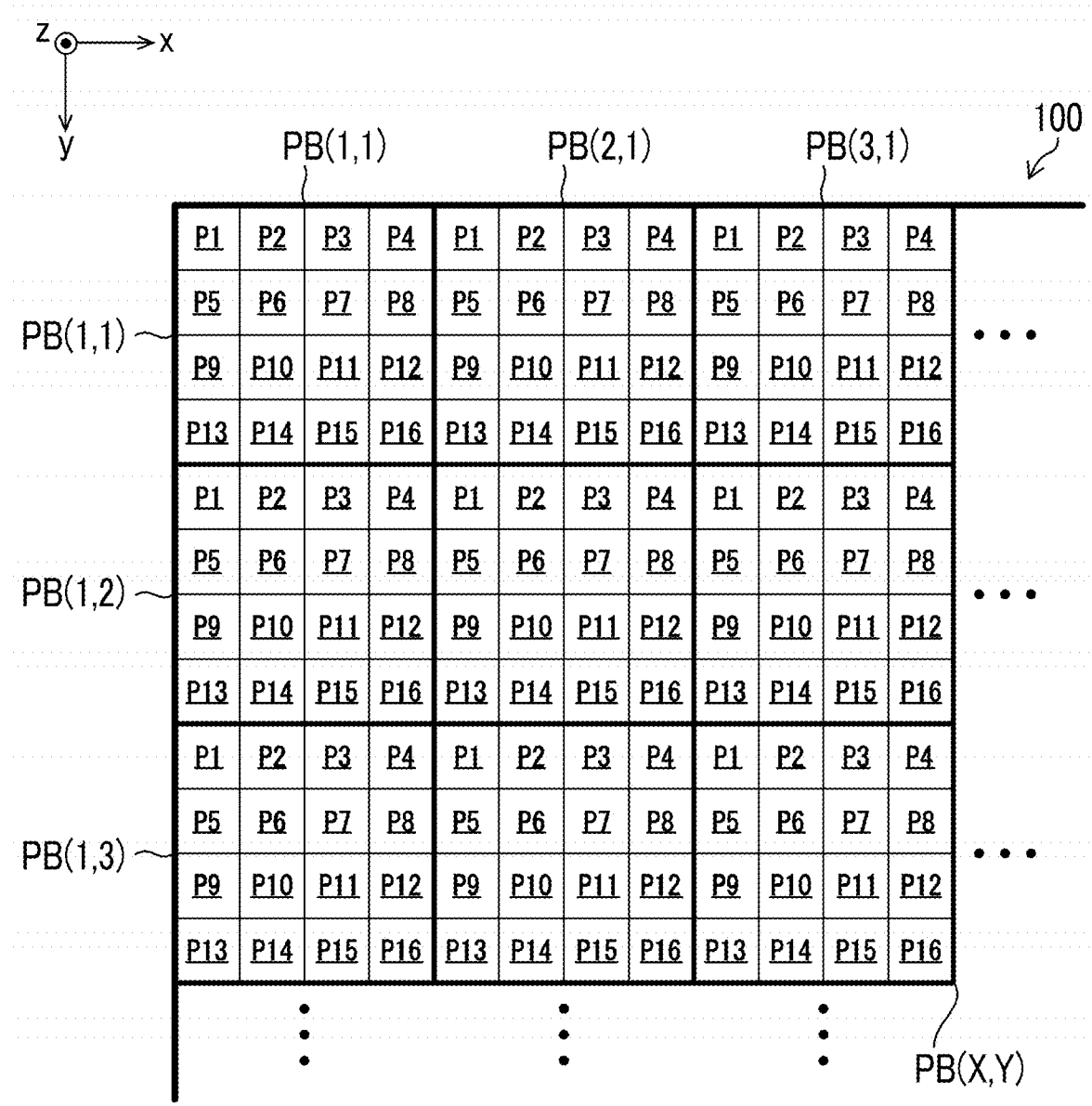
FIG. 13 is a diagram showing an arrangement of pixels of an imaging element.

FIG. 13 is a diagram showing a schematic configuration of an arrangement of pixels of the imaging element. As shown in FIG. 10, the imaging element 100 has a plurality of types of pixels (pixel P1 to pixel P16) on a light-receiving surface thereof. These pixels P1 to P16 are regularly arranged at a certain pitch along a horizontal direction (x-axis direction) and a vertical direction (y-axis direction). In the imaging apparatus 1 according to the first embodiment, in the imaging element 100, one pixel block PB (X,Y) is configured by 16 (4×4) adjacent pixels P1 to P16, and the pixel blocks PB (X,Y) are regularly arranged along the horizontal direction (x-axis direction) and the vertical direction (y-axis direction). (X,Y) indicate positions in the x-axis direction and the y-axis direction, respectively.

Figure 14:
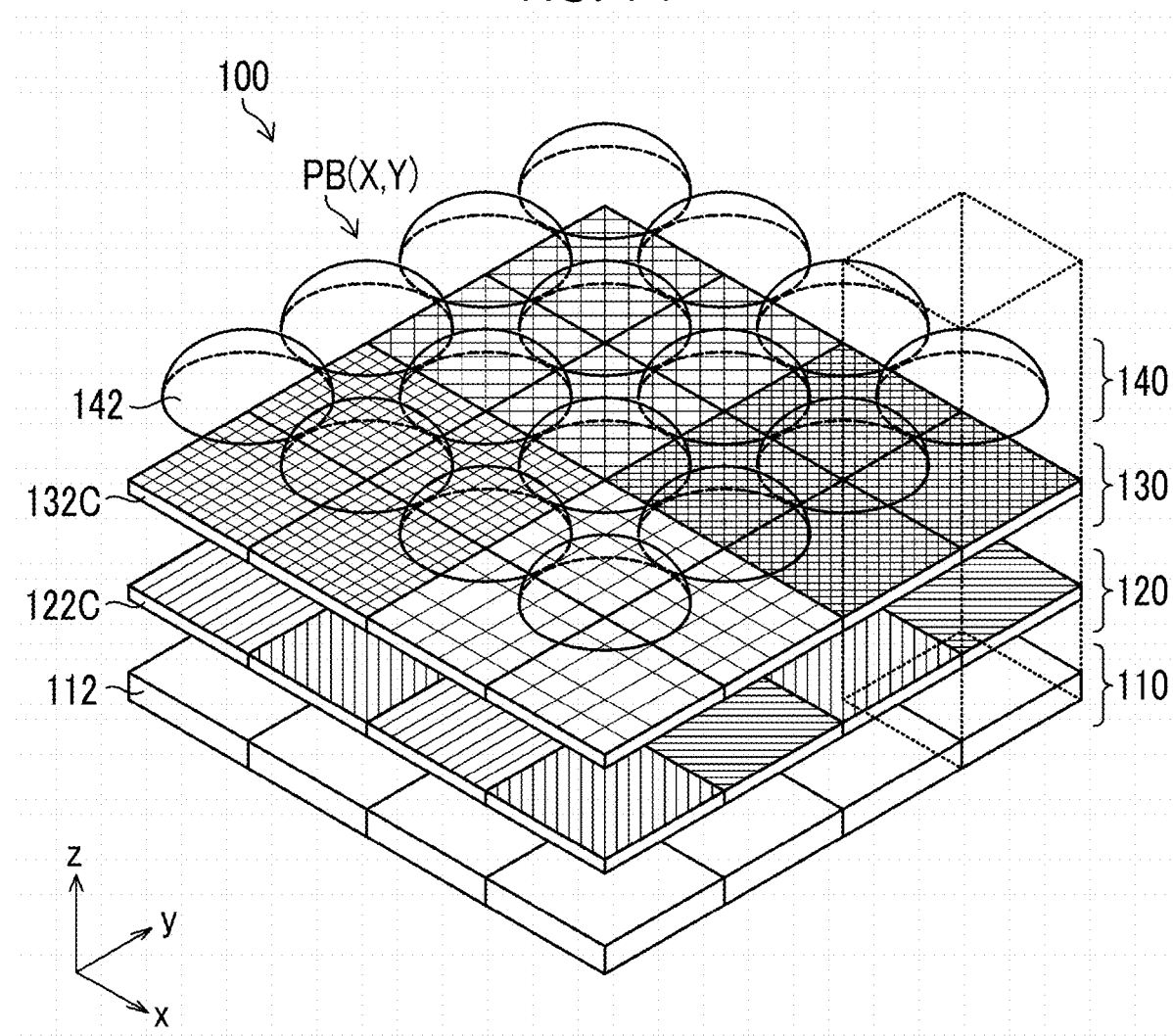
FIG. 14 is a diagram showing a configuration of the imaging element.
Figure 15:
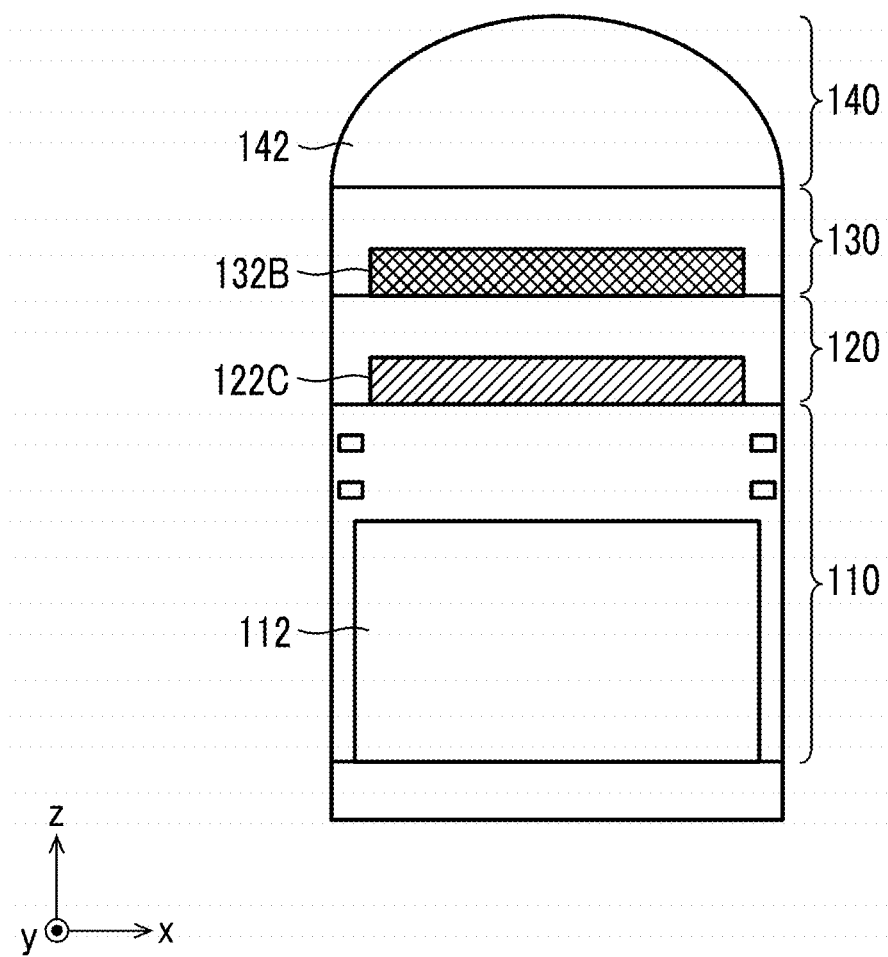
FIG. 15 is a cross-sectional view showing a configuration of the imaging element.

FIG. 14 is a diagram showing a schematic configuration of the imaging element 100. In addition, FIG. 15 is a cross-sectional view showing a schematic configuration of one pixel (broken line portion in FIG. 14). The imaging element 100 includes a pixel array layer 110, a polarizing filter element array layer 120 (polarization portion), a spectral filter element array layer 130 (optical filter), and a micro lens array layer 140. That is, the imaging element 100 comprises, on a pixel, a plurality of types of optical filters having different transmission wavelength ranges and a plurality of types of polarization portions having different transmission polarization directions. The layers are disposed in the order of the pixel array layer 110, the polarizing filter element array layer 120, the spectral filter element array layer 130, and the micro lens array layer 140 from an image plane side to an object side.

The pixel array layer 110 is configured by two-dimensionally arranging a large number of photodiodes 112. One photodiode 112 configures one pixel. The photodiodes 112 are regularly disposed along the horizontal direction (x-axis direction) and the vertical direction (y-axis direction). The polarizing filter element array layer 120 is configured by two-dimensionally arranging four types of polarizing filter elements 122A to 122D having different polarization directions of the transmitted light. Each of the polarizing filter elements 122A to 122D, one of which is provided for each pixel, is disposed at the same intervals as the photodiodes 112. The polarizing filter elements 122A to 122D are regularly arranged in each pixel block PB (X,Y).

Figure 16:
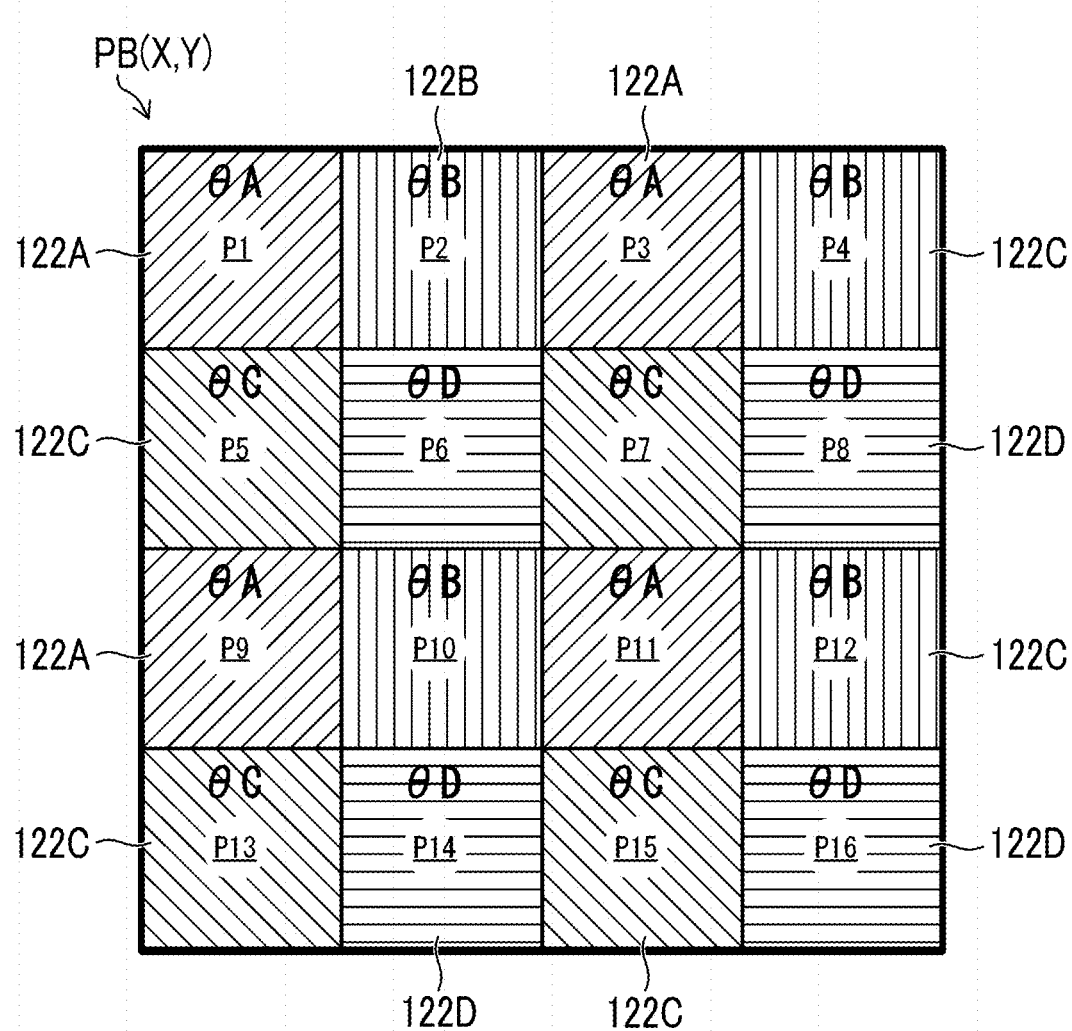
FIG. 16 is a diagram showing an arrangement pattern of polarizing filter elements.

FIG. 16 is a diagram showing an example of an arrangement pattern of the polarizing filter elements in one pixel block. As shown in FIG. 16, in the imaging apparatus 1 according to the first embodiment, the pixel P1, the pixel P3, the pixel P9, and the pixel P11 comprise the polarizing filter element 122A. In addition, the pixel P2, the pixel P4, the pixel P10, and the pixel P12 comprise the polarizing filter element 122B. In addition, the pixel P3, the pixel P7, the pixel P13, and the pixel P15 comprise the polarizing filter element 122C. In addition, the pixel P4, the pixel P8, the pixel P14, and the pixel P16 comprise the polarizing filter element 122D.

The polarizing filter elements 122A to 122D transmit the light in different polarization directions from each other. Specifically, the polarizing filter element 122A transmits the light in the polarization direction θA (for example, θA=45°). The polarizing filter element 122B transmits the light in the polarization direction θB (for example, θB=90°). The polarizing filter element 122C transmits the light in the polarization direction θC (for example, θC=135°). The polarizing filter element 122D transmits the light in the polarization direction θD (for example, θD=0°).

The spectral filter element array layer 130 is configured by two-dimensionally arranging four types of spectral filter elements 132A to 132D having different transmission wavelength characteristics. Each spectral filter element 132A to 132D, one of which is provided for each pixel, is disposed at the same intervals as the photodiodes 112. The spectral filter elements 132A to 132D are regularly arranged in each pixel block PB (X,Y).

Figure 17:
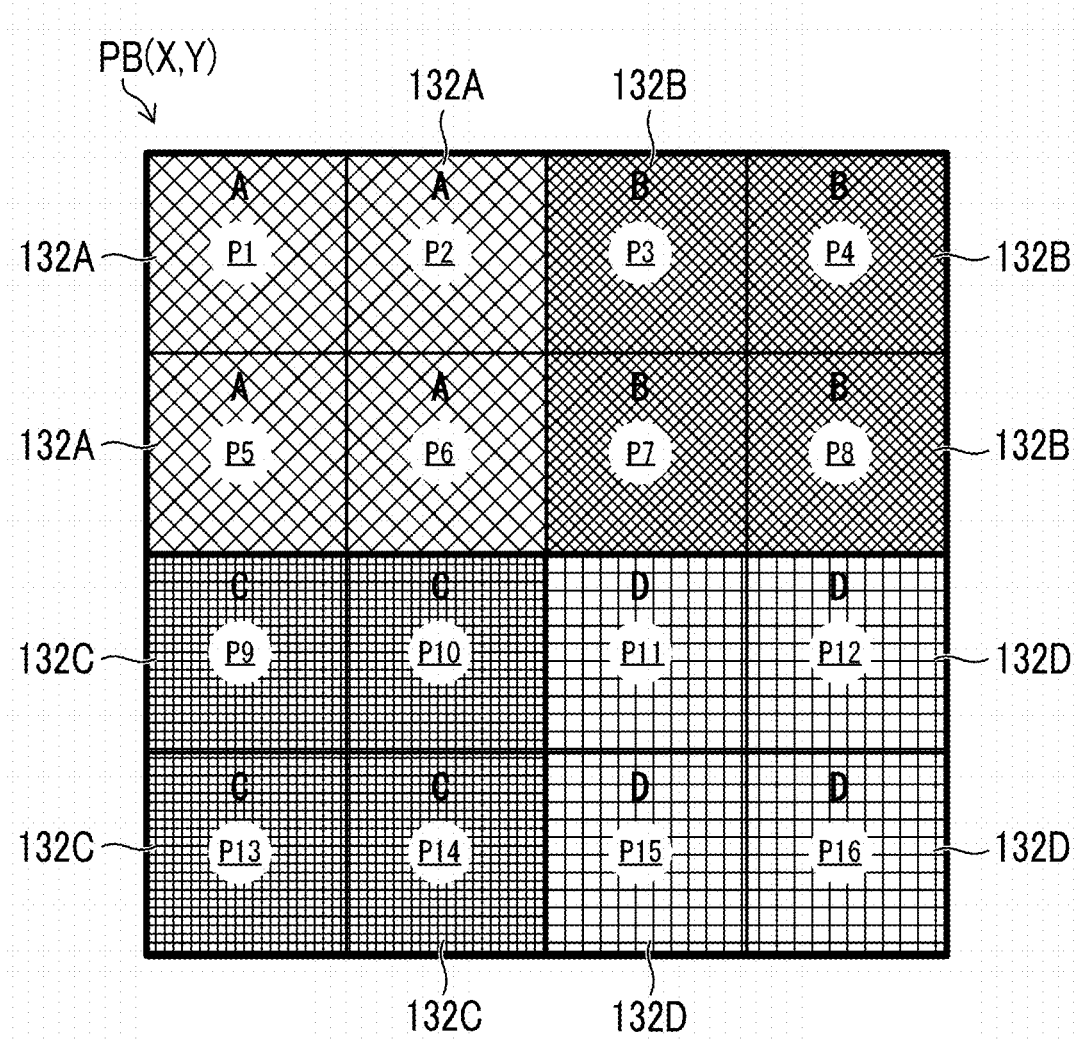
FIG. 17 is a diagram showing an arrangement pattern of spectral filter elements.

FIG. 17 is a diagram showing an example of an arrangement pattern of the spectral filter elements in one pixel block. As shown in FIG. 17, in the imaging apparatus 1 according to the first embodiment, the pixel P1, the pixel P2, the pixel P5, and the pixel P6 comprise the spectral filter element 132A. In addition, the pixel P3, the pixel P4, the pixel P7, and the pixel P8 comprise the spectral filter element 132B. In addition, the pixel P9, the pixel P10, the pixel P13, and the pixel P14 comprise the spectral filter element 132C. In addition, the pixel P11, the pixel P12, the pixel P15, and the pixel P16 comprise the spectral filter element 132D.

Figure 18:
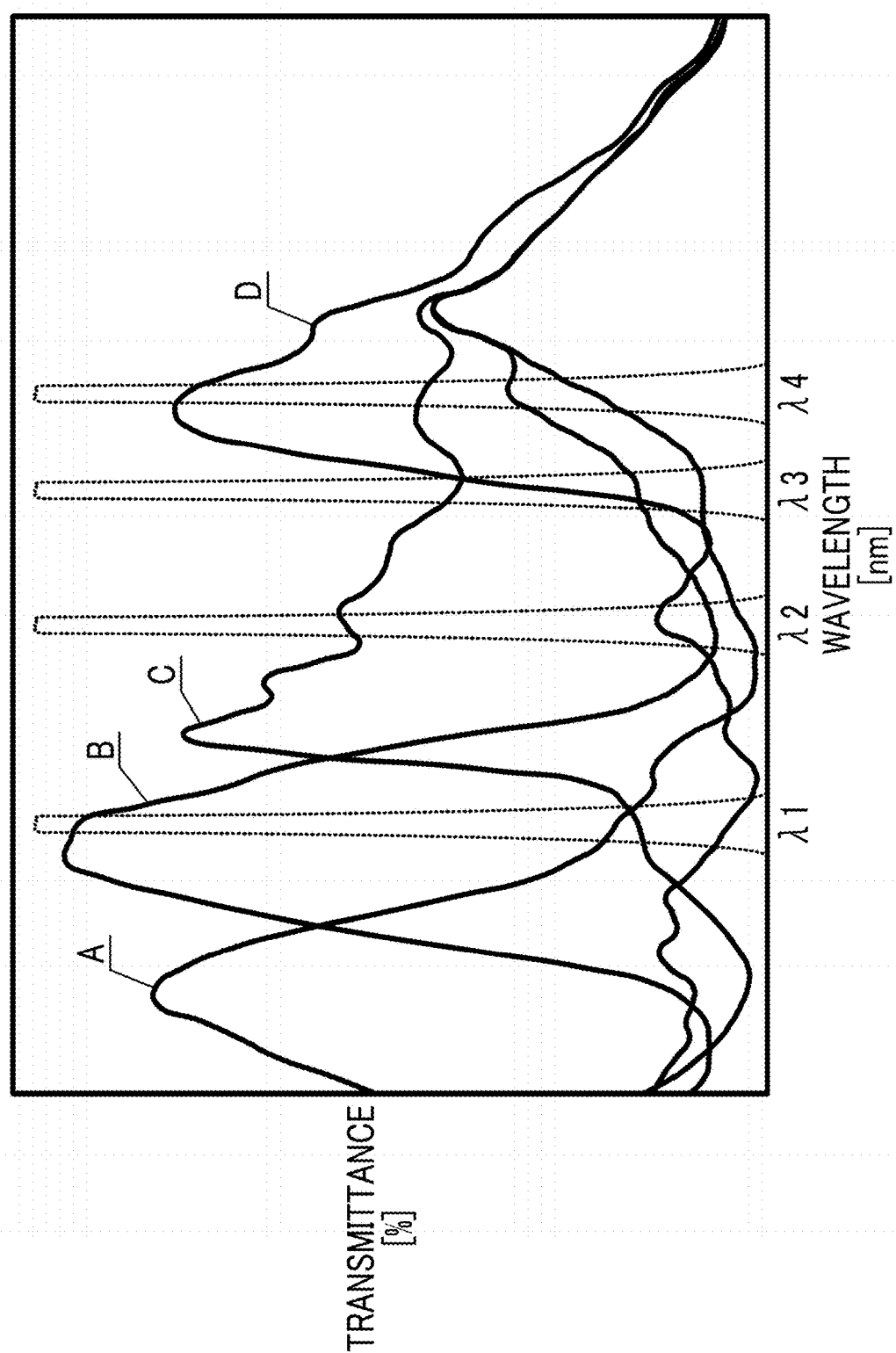
FIG. 18 is a diagram showing a transmission wavelength characteristic of the spectral filter element.

FIG. 18 is a graph showing an example of the transmission wavelength characteristic of each spectral filter element. In FIG. 18, A shows the transmission wavelength characteristic of the spectral filter element 132A. B shows the transmission wavelength characteristic of the spectral filter element 132B. C shows the transmission wavelength characteristic of the spectral filter element 132C. D shows the transmission wavelength characteristic of the spectral filter element 132D. The spectral filter elements 132A to 132D have different transmission wavelength characteristics from each other. Note that FIG. 18 shows an example in a case in which the spectral filter element 132A is configured by the spectral filter element which transmits blue (B) light, the spectral filter element 132B is configured by the spectral filter element which transmits green (G) light, the spectral filter element 132C is configured by the spectral filter element which transmits red (R) light, and the spectral filter element 132D is configured by the spectral filter element which transmits infrared (IR) light.

Here, as shown in FIG. 18, wavelength ranges λ1 to λ4 of the light transmitted through the bandpass filters 50A to 50D described above are set within ranges of transmission wavelength ranges of the spectral filter elements 132A to 132D. That is, the wavelength ranges λ1 to λ4 of the light transmitted through the bandpass filters 50A to 50D are set in regions of which the transmission wavelength ranges of the spectral filter elements 132A to 132D overlap with each other. In other words, the transmission wavelength ranges of the spectral filter elements 132A to 132D are set so as to cover the transmission wavelength ranges of the bandpass filters 50A to 50D. Therefore, each of the spectral filter elements 132A to 132D uses a filter which transmits light in a wide range.

The micro lens array layer 140 is configured by two-dimensionally arranging a large number of micro lenses 142. Each micro lens 142, one of which is provided for each pixel, is disposed at the same intervals as the photodiodes 112. The micro lenses 142 are provided for a purpose of efficiently condensing the light from the imaging optical system 10 on the photodiodes 112.

In the imaging element 100 configured as described above, in each pixel block PB (X,Y), each of the pixels P1 to P16 receives the light from the imaging optical system 10 as follows.

That is, the pixel P1 receives the light from the imaging optical system 10 via the spectral filter element 132A (transmission wavelength characteristic A) and the polarizing filter element 122A (polarization direction θA). In addition, the pixel P2 receives the light from the imaging optical system 10 via the spectral filter element 132A (transmission wavelength characteristic A) and the polarizing filter element 122B (polarization direction θB). In addition, the pixel P3 receives the light from the imaging optical system 10 via the spectral filter element 132B (transmission wavelength characteristic B) and the polarizing filter element 122A (polarization direction θA). In addition, the pixel P4 receives the light from the imaging optical system 10 via the spectral filter element 132B (transmission wavelength characteristic B) and the polarizing filter element 122B (polarization direction θB). In addition, the pixel P5 receives the light from the imaging optical system 10 via the spectral filter element 132A (transmission wavelength characteristic A) and the polarizing filter element 122C (polarization direction θC). In addition, the pixel P6 receives the light from the imaging optical system 10 via the spectral filter element 132A (transmission wavelength characteristic A) and the polarizing filter element 122D (polarization direction θD). In addition, the pixel P7 receives the light from the imaging optical system 10 via the spectral filter element 132B (transmission wavelength characteristic B) and the polarizing filter element 122C (polarization direction θC). In addition, the pixel P8 receives the light from the imaging optical system 10 via the spectral filter element 132B (transmission wavelength characteristic B) and the polarizing filter element 122D (polarization direction θD). In addition, the pixel P9 receives the light from the imaging optical system 10 via the spectral filter element 132C (transmission wavelength characteristic C) and the polarizing filter element 122A (polarization direction θA). In addition, the pixel P10 receives the light from the imaging optical system 10 via the spectral filter element 132C (transmission wavelength characteristic C) and the polarizing filter element 122B (polarization direction θB). In addition, the pixel P11 receives the light from the imaging optical system 10 via the spectral filter element 132D (transmission wavelength characteristic D) and the polarizing filter element 122A (polarization direction θA). In addition, the pixel P12 receives the light from the imaging optical system 10 via the spectral filter element 132D (transmission wavelength characteristic D) and the polarizing filter element 122B (polarization direction θB). In addition, the pixel P13 receives the light from the imaging optical system 10 via the spectral filter element 132C (transmission wavelength characteristic C) and the polarizing filter element 122C (polarization direction θC). In addition, the pixel P14 receives the light from the imaging optical system 10 via the spectral filter element 132C (transmission wavelength characteristic C) and the polarizing filter element 122D (polarization direction θD). In addition, the pixel P15 receives the light from the imaging optical system 10 via the spectral filter element 132D (transmission wavelength characteristic D) and the polarizing filter element 122C (polarization direction θC). In addition, the pixel P16 receives the light from the imaging optical system 10 via the spectral filter element 132D (transmission wavelength characteristic D) and the polarizing filter element 122D (polarization direction θD).

In this way, the pixels P1 to P16 receive the light having different characteristics (wavelength ranges and polarization directions), respectively, by having different optical characteristics from each other. That is, the pixels P1 to P16 constitute a plurality of pixel groups that selectively receive the light transmitted through any of the bandpass filters 50A to 50D (plurality of optical filters) by the spectral filter elements and the polarizing filter elements.

<Configuration of Signal Processing Unit>

The signal processing unit 200 (signal processing unit) processes the signals output from the imaging element 100 to generate image data of the multispectral image of four bands. That is, pieces of image data of four types of wavelength ranges λ1 to λ4 (a plurality of images corresponding to the wavelength ranges of the plurality of optical filters) transmitted through the bandpass filter unit 16 described above are generated.

Figure 19:
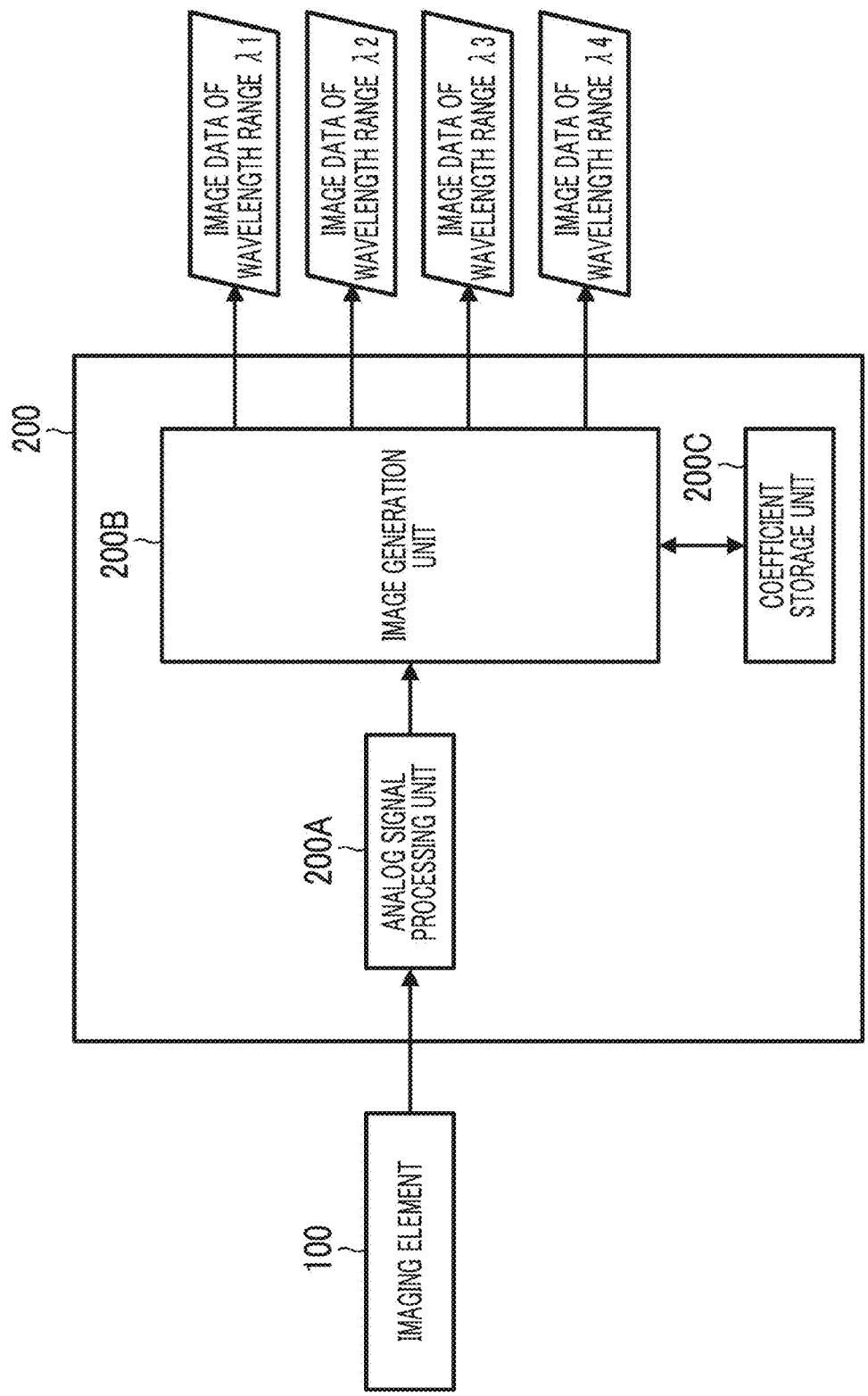
FIG. 19 is a block diagram showing a schematic configuration of a signal processing unit.

FIG. 19 is a block diagram showing a schematic configuration of a signal processing unit. As shown in FIG. 19, the signal processing unit 200 includes an analog signal processing unit 200A, an image generation unit 200B, and a coefficient storage unit 200C. The analog signal processing unit 200A takes in an analog pixel signal output from each pixel of the imaging element 100, performs signal processing (for example, sampling two correlation pile processing, amplification processing, and the like), then converts the processed pixel signal into a digital signal, and then outputs the converted digital signal. The image generation unit 200B performs signal processing on the pixel signal after being converted into the digital signal to generate the image data of each of the wavelength ranges (λ1 to λ4).

Figure 20:
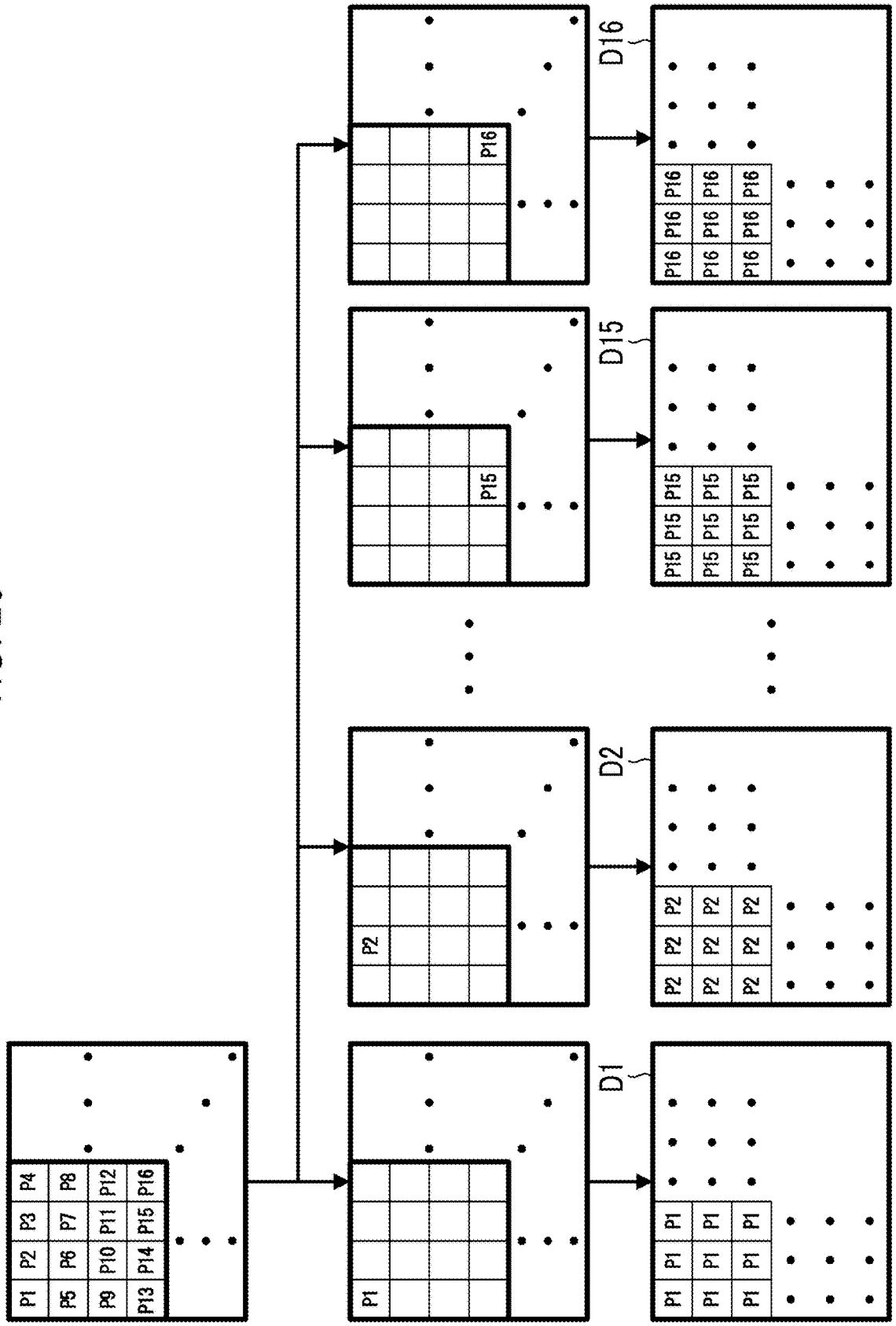
FIG. 20 is a conceptual diagram of image generation.
Figure 21A:
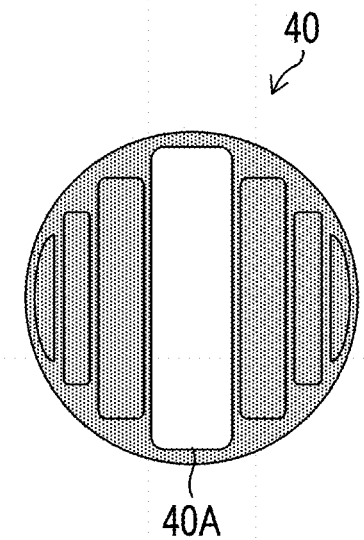
FIGS. 21A to 21D are diagrams showing a configuration of a light screen.
Figure 21B:
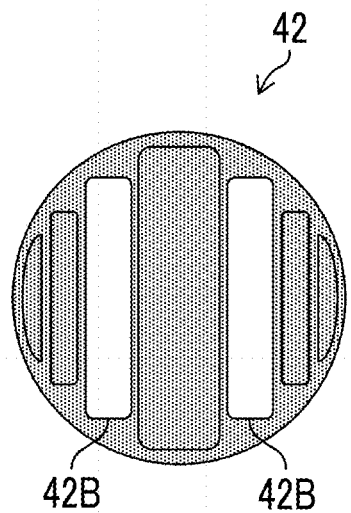
Figure 21C:
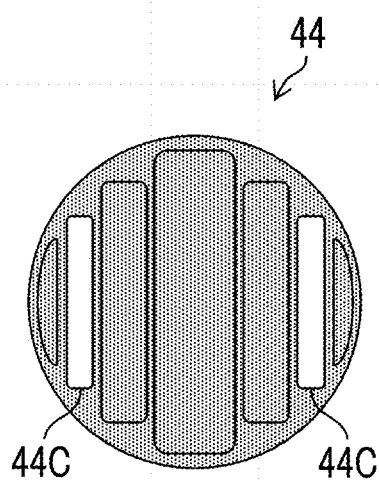
Figure 21D:
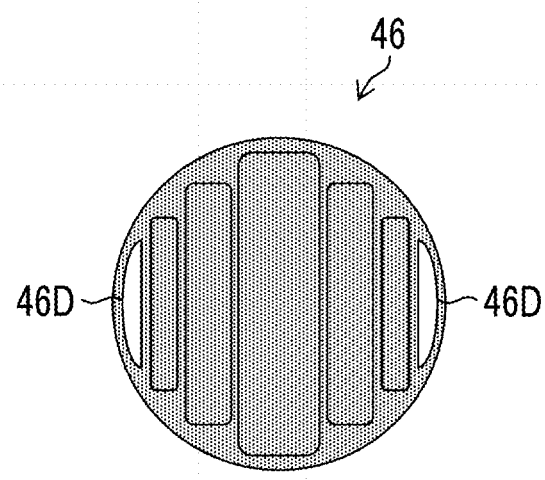

FIG. 20 is a conceptual diagram of image generation. Each pixel block PB (X,Y) includes 16 pixels P1 to P16, as described above. Therefore, 16 pieces of image data D1 to D16 are generated by separating and extracting the pixel signals of the pixels P1 to P16 from each pixel block PB (X,Y). However, interference (crosstalk) has occurred in these 16 pieces of image data D1 to D16. That is, since the light in each wavelength range is incident on each of the pixels P1 to P16, the generated image is an image in which images of the wavelength ranges are mixed. Therefore, the image generation unit 200B performs interference removal processing to generate the image data of each of the wavelength ranges ($\lambda$1 to $\lambda$4).

Hereinafter, the interference removal processing performed by the signal processing unit 200 will be described.

The pixel signal (signal value) obtained by the pixel P1 of each pixel block PB (X,Y) is referred to as $\alpha$1, and the pixel signals obtained by the pixels P2 to P16 are referred to as $\alpha$2 to $\alpha$16, respectively, in the same manner. Then, 16 pixel signals $\alpha$1 to $\alpha$16 can be obtained from each pixel block PB (X,Y). The image generation unit 200B calculates four pixel signals $\beta$1 to $\beta$4 corresponding to the light in the wavelength ranges $\lambda$1 to $\lambda$4 from 16 pixel signals $\alpha$1 to $\alpha$16, and removes interference. Specifically, the image generation unit 200B calculates four pixel signals $\beta$1 to $\beta$4 corresponding to the light in the wavelength ranges $\lambda$1 to $\lambda$4 via Equation 1 using the following matrix A, and removes the interference.

pixels P1 to P16. A ratio (interference ratio) at which the light in each of the wavelength ranges $\lambda$1 to $\lambda$4 emitted from the imaging optical system 10 is received by each of the pixels P1 to P16 is bij (i=1 to 16, j=1 to 4). For example, b11 is a ratio of the light in the wavelength range $\lambda$1 received by the pixel P1, b12 is a ratio of the light in the wavelength range $\lambda$2 received by the pixel P1, b13 is a ratio of the light in the wavelength range $\lambda$3 received by the pixel P1, and b14 is a ratio of the light in the wavelength range $\lambda$4 received by the pixel P1. In the following description, b21 to b164 are defined below in the same manner. This ratio bij (b11 to b164) can be determined in advance by unique determination from setting of the wavelength ranges $\lambda$1 to $\lambda$4 of the light transmitted through the bandpass filters 50A to 50D of the bandpass filter unit 16, setting of the polarization directions $\theta$1 to $\theta$4 of the light transmitted by the polarizing filters 21A to 21D, setting of the transmission wavelength characteristics A to D (see FIG. 18) of each of the pixels P1 to P16 of the imaging element 100, and setting of the polarization directions $\theta$A to $\theta$C (see FIG. 16) of the light received by the pixels P1 to P16 of the imaging element 100.

$$A = \begin{bmatrix} a11 & a12 & a13 & a14 & a15 & a16 & a17 & a18 & a19 & a110 & a111 & a112 & a113 & a114 & a115 & a116 \\ a21 & a22 & a23 & a24 & a25 & a26 & a27 & a28 & a29 & a210 & a211 & a212 & a213 & a214 & a215 & a216 \\ a31 & a32 & a33 & a34 & a35 & a36 & a37 & a38 & a39 & a310 & a311 & a312 & a313 & a314 & a315 & a316 \\ a41 & a42 & a43 & a44 & a45 & a46 & a47 & a48 & a49 & a410 & a411 & a412 & a413 & a414 & a415 & a416 \end{bmatrix} \quad \text{Equation 1}$$

$$\begin{bmatrix} \beta1 \\ \beta2 \\ \beta3 \\ \beta4 \end{bmatrix} = \begin{bmatrix} a11 & a12 & a13 & a14 & a15 & a16 & a17 & a18 & a19 & a110 & a111 & a112 & a113 & a114 & a115 & a116 \\ a21 & a22 & a23 & a24 & a25 & a26 & a27 & a28 & a29 & a210 & a211 & a212 & a213 & a214 & a215 & a216 \\ a31 & a32 & a33 & a34 & a35 & a36 & a37 & a38 & a39 & a310 & a311 & a312 & a313 & a314 & a315 & a316 \\ a41 & a42 & a43 & a44 & a45 & a46 & a47 & a48 & a49 & a410 & a411 & a412 & a413 & a414 & a415 & a416 \end{bmatrix} * \begin{bmatrix} \alpha1 \\ \alpha2 \\ \alpha3 \\ \alpha4 \\ \alpha5 \\ \alpha6 \\ \alpha7 \\ \alpha8 \\ \alpha9 \\ \alpha10 \\ \alpha11 \\ \alpha12 \\ \alpha13 \\ \alpha14 \\ \alpha15 \\ \alpha16 \end{bmatrix}$$

Note that the pixel signal $\beta$1 is the pixel signal corresponding to the light in the wavelength range $\lambda$1, the pixel signal $\beta$2 is the pixel signal corresponding to the light in the wavelength range $\lambda$2, the pixel signal $\beta$3 is the pixel signal corresponding to the light in the wavelength range $\lambda$3, and the pixel signal $\beta$4 is the pixel signal corresponding to the light in the wavelength range $\lambda$4. Therefore, the image data of the wavelength range $\lambda$1 is generated from the pixel signal $\beta$1, the image data of the wavelength range $\lambda$2 is generated from the pixel signal $\beta$2, the image data of the wavelength range $\lambda$3 is generated from the pixel signal $\beta$3, and the image data of the wavelength range $\lambda$4 is generated from the pixel signal $\beta$4. Hereinafter, the reason why the interference can be removed by the above-mentioned Equation 1 will be described.

The interference occurs by the light in each of the wavelength ranges $\lambda$1 to $\lambda$4 being mixed into each of the The following relationship is satisfied between the pixel signals $\alpha$1 to $\alpha$16 obtained by the pixels P1 to P16 of each pixel block PB (X,Y) and the pixel signals $\beta$1 to $\beta$4 corresponding to the light in the wavelength ranges $\lambda$1 to $\lambda$4.

Regarding the pixel signal $\alpha$1 obtained by the pixel P1, "b11*$\beta$1+b12*$\beta$2+b13*$\beta$3+b14*$\beta$4=$\alpha$1 . . . Equation 2" is satisfied ("*" is a symbol of integration).

Regarding the pixel signal $\alpha$2 obtained by the pixel P2, "b21*$\beta$1+b22*$\beta$2+b23*$\beta$3+b24*$\beta$4=$\alpha$2 . . . Equation 3" is satisfied.

Regarding the pixel signal $\alpha$3 obtained by the pixel P3, "b31*$\beta$1+b32*$\beta$2+b33*$\beta$3+b34*$\beta$4=$\alpha$3 . . . Equation 4" is satisfied.

Regarding the pixel signal $\alpha$4 obtained by the pixel P4, "b41*$\beta$1+b42*$\beta$2+b43*$\beta$3+b44*$\beta$4=$\alpha$4 . . . Equation 5" is satisfied.

Regarding the pixel signal $\alpha 5$ obtained by the pixel P5, "$b51*\beta 1+b52*\beta 2+b53*\beta 3+b54*\beta 4=\alpha 5$ . . . Equation 6" is satisfied.

Regarding the pixel signal $\alpha 6$ obtained by the pixel P6, "$b61*\beta 1+b62*\beta 2+b63*\beta 3+b64*\beta 4=\alpha 6$ . . . Equation 7" is satisfied.

Regarding the pixel signal $\alpha 7$ obtained by the pixel P7, "$b71*\beta 1+b72*\beta 2+b73*\beta 3+b74*\beta 4=\alpha 7$ . . . Equation 8" is satisfied.

Regarding the pixel signal $\alpha 8$ obtained by the pixel P8, "$b81*\beta 1+b82*\beta 2+b83*\beta 3+b84*\beta 4=\alpha 8$ . . . Equation 9" is satisfied.

Regarding the pixel signal $\alpha 9$ obtained by the pixel P9, "$b91*\beta 1+b92*\beta 2+b93*\beta 3+b94*\beta 4=\alpha 9$ . . . Equation 10" is satisfied.

Regarding the pixel signal $\alpha 10$ obtained by the pixel P10, "$b101*\beta 1+b102*\beta 2+b103*\beta 3+b104*\beta 4=\alpha 10$ . . . Equation 11" is satisfied.

Regarding the pixel signal $\alpha 11$ obtained by the pixel P11, "$b111*\beta 1+b112*\beta 2+b113*\beta 3+b114*\beta 4=\alpha 11$ . . . Equation 12" is satisfied.

Regarding the pixel signal $\alpha 12$ obtained by the pixel P12, "$b121*\beta 1+b122*\beta 2+b123*\beta 3+b124*\beta 4=\alpha 12$ . . . Equation 13" is satisfied.

Regarding the pixel signal $\alpha 13$ obtained by the pixel P13, "$b131*\beta 1+b132*\beta 2+b133*\beta 3+b134*\beta 4=\alpha 13$ . . . Equation 14" is satisfied.

Regarding the pixel signal $\alpha 14$ obtained by the pixel P14, "$b141*\beta 1+b142*\beta 2+b143*\beta 3+b144*\beta 4=\alpha 14$ . . . Equation 15" is satisfied.

Regarding the pixel signal $\alpha 15$ obtained by the pixel P15, "$b151*\beta 1+b152*\beta 2+b153*\beta 3+b154*\beta 4=\alpha 15$ . . . Equation 16" is satisfied.

Regarding the pixel signal $\alpha 16$ obtained by the pixel P16, "$b161*\beta 1+b162*\beta 2+b163*\beta 3+b164*\beta 4=\alpha 16$ . . . Equation 17" is satisfied.

Here, the simultaneous equations of Equations 2 to 17 can be expressed by Equation 18 using a matrix B.

$$B = \begin{bmatrix} b11 & b12 & b13 & b14 \\ b21 & b22 & b23 & b24 \\ b31 & b32 & b33 & b34 \\ b41 & b42 & b43 & b44 \\ b51 & b52 & b53 & b54 \\ b61 & b62 & b63 & b64 \\ b71 & b72 & b73 & b74 \\ b81 & b82 & b83 & b84 \\ b91 & b92 & b93 & b94 \\ b101 & b102 & b103 & b104 \\ b111 & b112 & b113 & b114 \\ b121 & b122 & b123 & b124 \\ b131 & b132 & b133 & b134 \\ b141 & b142 & b143 & b144 \\ b151 & b152 & b153 & b154 \\ b161 & b162 & b163 & b164 \end{bmatrix} \quad \text{Equation 18}$$

$$\begin{bmatrix} b11 & b12 & b13 & b14 \\ b21 & b22 & b23 & b24 \\ b31 & b32 & b33 & b34 \\ b41 & b42 & b43 & b44 \\ b51 & b52 & b53 & b54 \\ b61 & b62 & b63 & b64 \\ b71 & b72 & b73 & b74 \\ b81 & b82 & b83 & b84 \\ b91 & b92 & b93 & b94 \\ b101 & b102 & b103 & b104 \\ b111 & b112 & b113 & b114 \\ b121 & b122 & b123 & b124 \\ b131 & b132 & b133 & b134 \\ b141 & b142 & b143 & b144 \\ b151 & b152 & b153 & b154 \\ b161 & b162 & b163 & b164 \end{bmatrix} * \begin{bmatrix} \beta 1 \\ \beta 2 \\ \beta 3 \\ \beta 4 \end{bmatrix} = \begin{bmatrix} \alpha 1 \\ \alpha 2 \\ \alpha 3 \\ \alpha 4 \\ \alpha 5 \\ \alpha 6 \\ \alpha 7 \\ \alpha 8 \\ \alpha 9 \\ \alpha 10 \\ \alpha 11 \\ \alpha 12 \\ \alpha 13 \\ \alpha 14 \\ \alpha 15 \\ \alpha 16 \end{bmatrix}$$

$\beta 1$ to $\beta 4$, which are the solutions of the simultaneous equations of Equations 2 to 17, are calculated by multiplying both sides of Equation 18 by an inverse matrix $B^{-1}$ of the matrix B.

$$\begin{bmatrix} \beta 1 \\ \beta 2 \\ \beta 3 \\ \beta 4 \end{bmatrix} = \begin{bmatrix} b11 & b12 & b13 & b14 \\ b21 & b22 & b23 & b24 \\ b31 & b32 & b33 & b34 \\ b41 & b42 & b43 & b44 \\ b51 & b52 & b53 & b54 \\ b61 & b62 & b63 & b64 \\ b71 & b72 & b73 & b74 \\ b81 & b82 & b83 & b84 \\ b91 & b92 & b93 & b94 \\ b101 & b102 & b103 & b104 \\ b111 & b112 & b113 & b114 \\ b121 & b122 & b123 & b124 \\ b131 & b132 & b133 & b134 \\ b141 & b142 & b143 & b144 \\ b151 & b152 & b153 & b154 \\ b161 & b162 & b163 & b164 \end{bmatrix}^{-1} * \begin{bmatrix} \alpha 1 \\ \alpha 2 \\ \alpha 3 \\ \alpha 4 \\ \alpha 5 \\ \alpha 6 \\ \alpha 7 \\ \alpha 8 \\ \alpha 9 \\ \alpha 10 \\ \alpha 11 \\ \alpha 12 \\ \alpha 13 \\ \alpha 14 \\ \alpha 15 \\ \alpha 16 \end{bmatrix} \quad \text{Equation 19}$$

In this way, the pixel signals $\beta 1$ to $\beta 4$ corresponding to the wavelength ranges $\lambda 1$ to $\lambda 4$ can be calculated from the signal values (pixel signals $\alpha 1$ to $\alpha 16$) of the pixels P1 to P16 based on the ratio in which the light in the wavelength ranges $\lambda 1$ to $\lambda 4$ emitted from the imaging optical system 10 is received by the pixels P1 to P16 of the pixel block PB (X,Y).

In Equation 1, the inverse matrix $B^{-1}$ of Equation 19 is set to A ($B^{-1}$=A). Therefore, elements aij of the matrix A in Equation 1 can be acquired by obtaining the inverse matrix $B^{-1}$ of the matrix B.

The coefficient storage unit 200C stores the elements aij of the matrix A for performing the interference removal processing, as a coefficient group.

<Light Screen>

Each element of the matrix A can be calculated from the result of imaging by inserting any of the light screens shown in FIGS. 21A to 21D into the optical path of the imaging optical system 10. A light screen 40 shown in FIG. 21A has an aperture 40A at a portion corresponding to the bandpass filter 50A (see FIG. 2A) mounted on the bandpass filter unit 16, and the other portions corresponding to the other bandpass filters 50B to 50D are shielded. Similarly, a light screen 42 shown in FIG. 21B has an aperture 42B at a portion corresponding to the bandpass filter 50B, and the other portions corresponding to the bandpass filters 50A, 50C, and 50D are shielded. Further, a light screen 44 shown in FIG. 21C has an aperture 44C at a portion corresponding to the bandpass filter 50C, and the other portions corresponding to the bandpass filters 50A, 50B, and 50D are shielded. A light screen 46 shown in FIG. 21D has an aperture 46D at a portion corresponding to the bandpass filter 50D, and the other portions corresponding to the bandpass filters 50A to 50C are shielded.

The image generation unit 200B acquires the coefficient group from the coefficient storage unit 200C, calculates the pixel signals β1 to β4 corresponding to the wavelength ranges λ1 to λ4 via Equation 1 from the pixel signals α1 to α16 obtained from the pixels P1 to P16 of each pixel block PB (X,Y), and generates the image data of the wavelength ranges λ1 to λ4.

The image data of the wavelength ranges λ1 to λ4 generated by the image generation unit 200B are output to the outside and stored in a storage device (not shown), as needed. In addition, the image data is displayed on a display (not shown), as needed.

<Image Generation>

Figure 22:
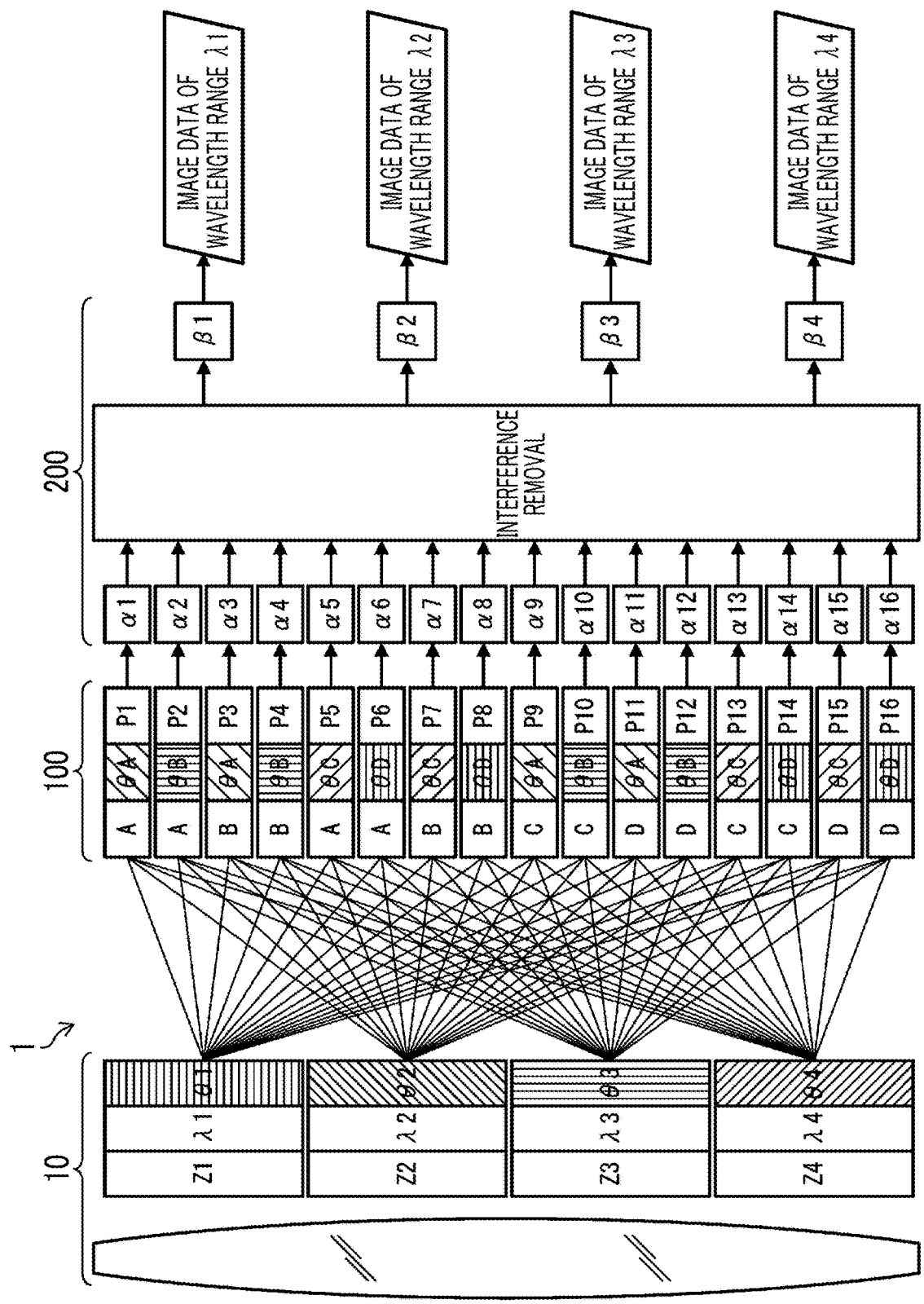
FIG. 22 is a conceptual diagram of the image generation by the imaging apparatus.

FIG. 22 is a conceptual diagram of the image generation by the imaging apparatus 1.

The light beams incident on the imaging optical system 10 become four types of the light having different characteristics, which are incident on the imaging element 100. Specifically, the light beams become light (first light) of the polarization direction θ1 and the wavelength range 1, light (second light) of the polarization direction θ2 and the wavelength range λ2, light (third light) of the polarization direction θ3 and the wavelength range λ3, and light (fourth light) of the polarization direction θ4 and the wavelength range λ4, which are incident on the imaging element 100.

In each pixel block PB (X,Y) of the imaging element 100, the light in each of the wavelength ranges emitted from the imaging optical system 10 is received in each of the pixels P1 to P16 at the ratio bij described above. That is, the light in each of the wavelength ranges λ1 to λ4 is received at the ratio bij by the actions of the polarizing filter elements 122A to 122D and the spectral filter elements 132A to 132D provided in each of the pixels P1 to P16.

The signal processing unit 200 calculates the pixel signals β1 to β4 corresponding to the light in the wavelength ranges λ1 to λ4 from the pixel signals α1 to α16 obtained from the pixels P1 to P16 of each pixel block PB (X,Y) of the imaging element 100, and generates the image data of the wavelength ranges λ1 to λ4. That is, the signal processing unit 200 performs arithmetic processing (interference removal processing) via Equation 1 using the matrix A, calculates the pixel signals β1 to β4 corresponding to the light in the wavelength ranges λ1 to λ4 from the pixel signals α1 to α16 of the pixels P1 to P16 obtained from the imaging element 100, and generates the image data of the wavelength ranges λ1 to λ4.

In this way, with the imaging apparatus 1 according to the first embodiment, the image of four types of different wavelength ranges (multispectral image of four bands) can be captured by using one imaging optical system 10 and one (single plate) imaging element 100.

Modification Example

A modification example of the imaging apparatus 1 according to the first embodiment described above will be described.

Another Example (No. 1) of Bandpass Filter Unit

Figure 23A:
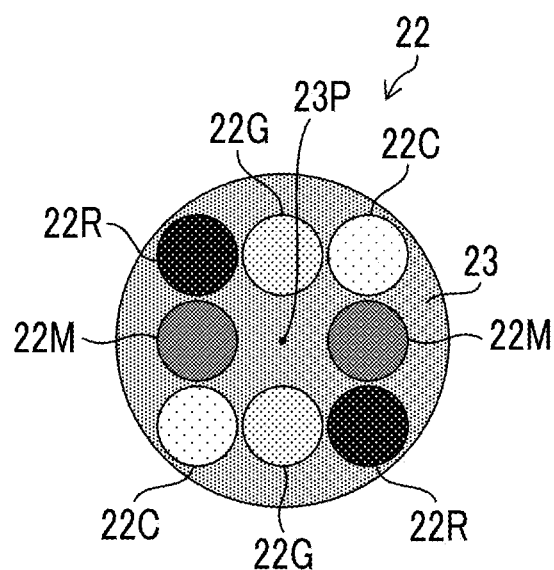
FIGS. 23A and 23B are diagrams showing another aspect of the bandpass filter unit.
Figure 23B:
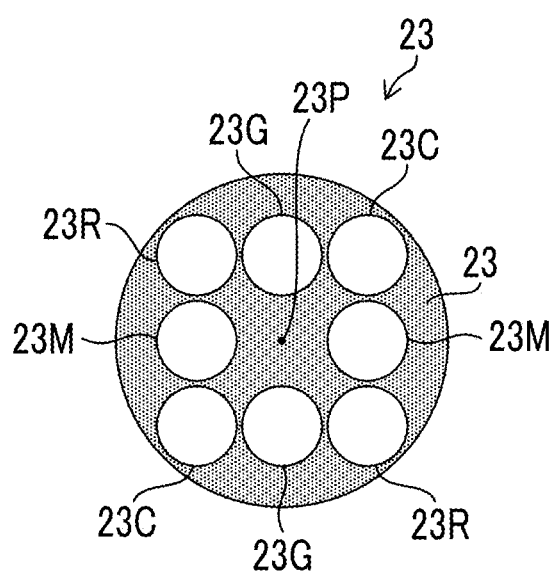

FIGS. 23A and 23B are diagrams showing another example (No. 1) of the bandpass filter unit. In an aspect shown in FIGS. 23A and 23B, in a bandpass filter unit 22, two of each of bandpass filters 22R, 22G, 22C, and 22M (a plurality of bandpass filters) having different wavelength ranges of transmitted light are mounted on a frame 23 (see FIG. 23A). The frame 23 is provided with two of each of circular aperture regions 23R, 23G, 23C, and 23M (see FIG. 23B). The aperture regions are arranged symmetrically with respect to a centroid 23P of the frame 23. Further, for each wavelength range, a plurality of bandpass filters having the same wavelength range are mounted in the plurality of aperture regions, respectively. In FIGS. 23A and 23B, the aperture region and the bandpass filter have the same shape and area regardless of the transmission wavelength range, but the area may correspond to the transmission wavelength range as in the first embodiment.

The bandpass filter unit of the aspect shown in FIGS. 23A and 23B has features such as "the centroid of the aperture region for each color (frequency range of transmitted light) does not shift", "the luminous flux can be narrowed without shifting the centroid for each color", "easy to manufacture", "easy to perform aberration correction for each color", "easy to acquire an interference removal matrix", and "rotationally symmetric".

Another Example (No. 2) of Bandpass Filter Unit

Figure 24A:
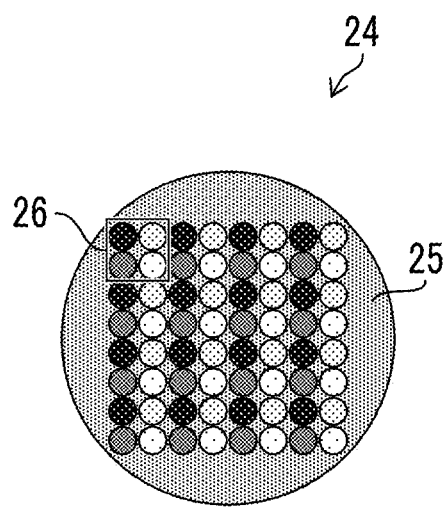
FIGS. 24A and 24B are diagrams showing still another aspect of the bandpass filter unit.
Figure 24B:
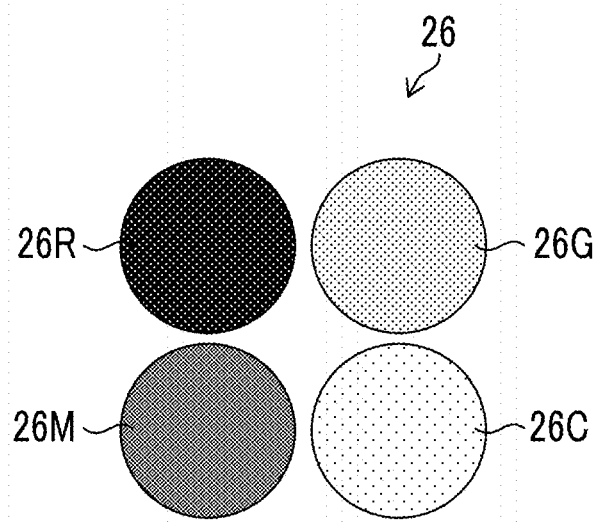

FIGS. 24A and 24B are diagrams showing another example (No. 2) of the bandpass filter unit. In an aspect shown in FIGS. 24A and 24B, in a bandpass filter unit 24, a basic pattern 26 of the bandpass filter is mounted on a frame 25 repeatedly in the horizontal direction and the vertical direction, in FIGS. 24A and 24B (16 in total; see FIG. 24A). As shown in FIG. 24B, the basic pattern 26 is composed of four bandpass filters 26R, 26G, 26C, and 26M having different wavelength ranges of transmitted light. Although the illustration of the aperture region is omitted in the aspect shown in FIGS. 24A and 24B, the aperture region has a disposition, shape, and size corresponding to the arrangement of the bandpass filters. As in the first embodiment, a bandpass filter having a longer wavelength at the center of the wavelength range of transmitted light may be mounted in an aperture region having a larger aperture area.

The bandpass filter unit of the aspect shown in FIGS. 24A and 24B has features such as "the centroid of the aperture region for each color (frequency range of transmitted light) does not shift", "the luminous flux can be reduced without shifting the centroid for each color", "the edge part light quantity for each color is symmetrical", and "rotationally symmetric".

Another Example (No. 3) of Bandpass Filter Unit

Figure 25:
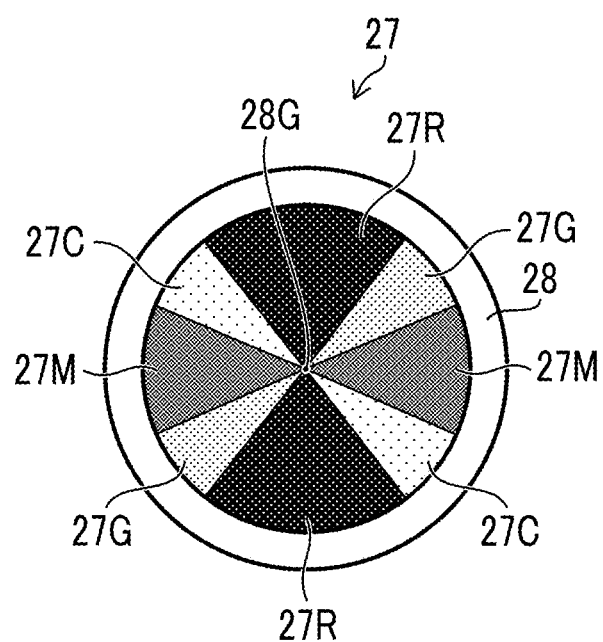
FIG. 25 is a diagram showing still another aspect of the bandpass filter unit.

FIG. 25 is a diagram showing another example (No. 3) of the bandpass filter unit. In an aspect shown in FIG. 25, in a bandpass filter unit 27, two of each of fan-shaped bandpass filters 27R, 27G, 27C, and 27M having different wavelength ranges of transmitted light are mounted on a frame 28. The bandpass filters are mounted in aperture regions (not shown) arranged symmetrically with respect to a centroid 28G of the frame 28. The area of the bandpass filter 27R is the largest among the bandpass filters (and corresponding aperture regions). The aperture region and the bandpass filter can have an area corresponding to the transmission wavelength range, as in the first embodiment and "another example (No. 2)".

Another Example (No. 4) of Bandpass Filter Unit

In the first embodiment described above and the aspects of FIGS. 23A to 25, the bandpass filter unit has four types of bandpass filters having different wavelength ranges of transmitted light. However, in the optical element according to the embodiment of the present invention, the wavelength range of the bandpass filter unit is not limited to four types. In another example (No. 4) of the bandpass filter unit shown in FIGS. 26A to 26C, the bandpass filter unit has three types of bandpass filters.

Figure 26A:
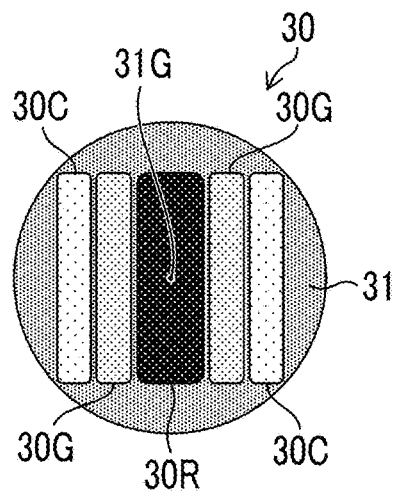
FIGS. 26A to 26C are diagrams showing still another aspect of the bandpass filter unit.

In the bandpass filter unit 30 shown in FIG. 26A, bandpass filters 30R, 30G, and 30C having different wavelength ranges of transmitted light are mounted on a frame 31 (one bandpass filter 30R and two of each of bandpass filters 30G and 30C). The area of the bandpass filter 30R is the largest, and the areas of the bandpass filters 30G and 30C are narrower than that of the bandpass filter 30R (the areas of the bandpass filters 30G and 30C are the same). The bandpass filter 30R is mounted in a single aperture region (not shown) surrounding a centroid 31G of the frame 31, and the bandpass filters 30G and 30C are mounted in a plurality of aperture regions (not shown) arranged symmetrically with respect to the centroid 31G. In addition, also in the aspect shown in FIG. 26A, the bandpass filter may be mounted in an aperture region having an aperture area corresponding to the wavelength range. Further, the bandpass filters may be mounted such that a bandpass filter having a longer wavelength at the center of the wavelength range is mounted in an aperture region having a larger aperture area. Further, the bandpass filters may be mounted such that a bandpass filter mounted farther from the centroid 31G (feature point) of the frame 31 is mounted in the aperture region having a narrower aperture area.

The bandpass filter unit of the aspect shown in FIG. 26A has features such as "the centroid of the aperture region for each color (frequency range of transmitted light) does not shift", "the luminous flux can be narrowed without shifting the centroid for each color", "easy to manufacture", "easy to perform aberration correction for each color", and "easy to acquire an interference removal matrix".

Figure 26B:
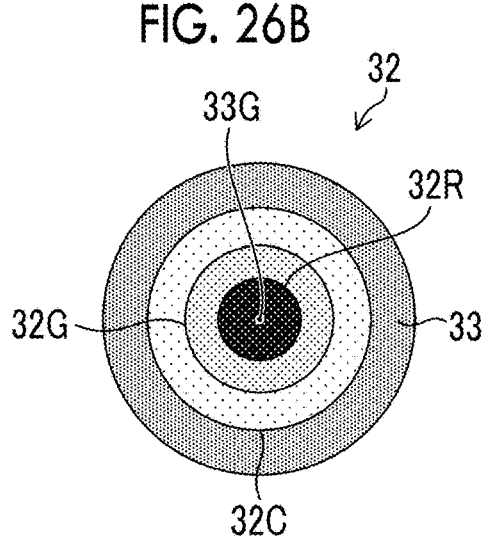

In a bandpass filter unit 32 shown in FIG. 26B, bandpass filters 32R, 32G, and 32C having different wavelength ranges of transmitted light are mounted on a frame 33. Also in the aspect shown in FIG. 26B, the bandpass filter may be mounted in an aperture region having an aperture area corresponding to the wavelength range. Further, as in the above-described aspect, the bandpass filters may be mounted such that a bandpass filter having a longer wavelength at the center of the wavelength range is mounted in an aperture region having a larger aperture area. Further, the bandpass filters may be mounted such that a bandpass filter mounted farther from a centroid 33G (feature point) of the frame 33 is mounted in the aperture region having a narrower aperture area.

The bandpass filter unit of the aspect shown in FIG. 26B has features such as "the centroid of the aperture region for each color (frequency range of transmitted light) does not shift", "the edge part light quantity for each color is symmetrical", and "rotationally symmetric".

Figure 26C:
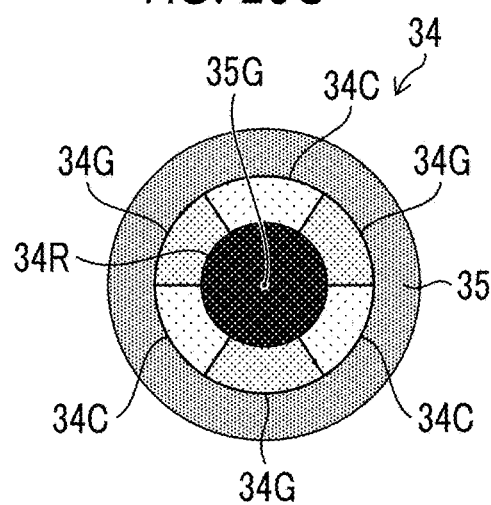

In a bandpass filter unit 34 shown in FIG. 26C, bandpass filters 34R, 34G, and 34C having different wavelength ranges of transmitted light are mounted on a frame 35 (one bandpass filter 34R, three bandpass filters 34G, and three bandpass filters 34C). The bandpass filter 34R is mounted in a single aperture region (not shown) surrounding a centroid 35G of the frame 35, and the bandpass filters 34G and 34C are mounted in a plurality of aperture regions (not shown) arranged symmetrically with respect to the centroid 35G. Similarly to the above-described aspect, also in an aspect shown in FIG. 26B, the bandpass filter may be mounted in an aperture region having an aperture area corresponding to the wavelength range. Further, the bandpass filters may be mounted such that a bandpass filter having a longer wavelength at the center of the wavelength range is mounted in an aperture region having a larger aperture area.

The bandpass filter unit of the aspect shown in FIG. 26C has features such as "the centroid of the aperture region for each color (frequency range of transmitted light) does not shift", "easy to perform aberration correction for each color", "the edge part light quantity for each color is symmetrical", and "rotationally symmetric".

Another Example (No. 5) of Bandpass Filter Unit

Figure 27A:
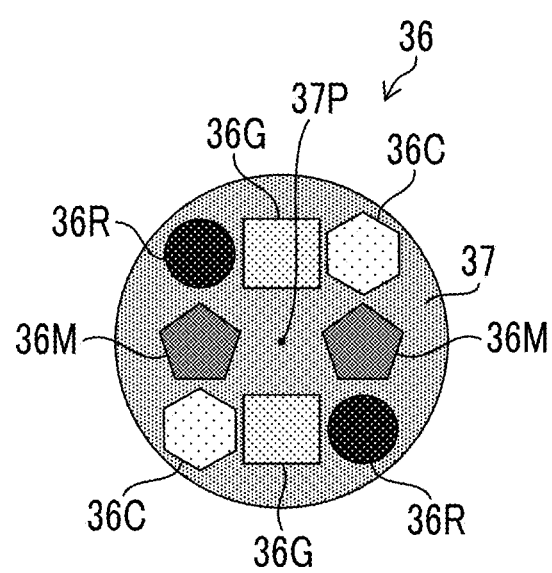
FIGS. 27A and 27B are diagrams showing still another aspect of the bandpass filter unit.
Figure 27B:
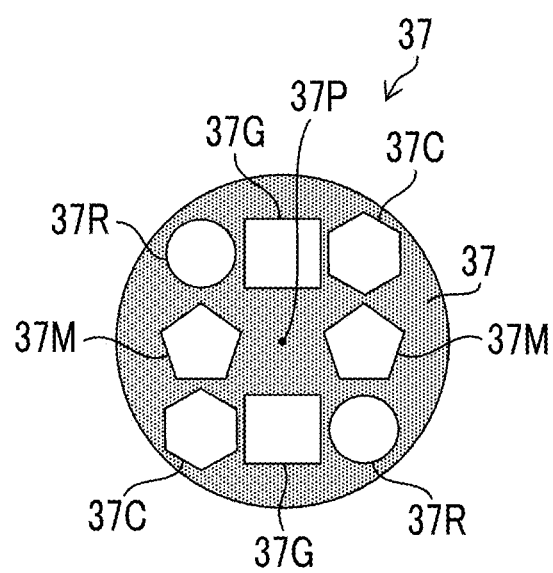

FIGS. 27A and 27B are diagrams showing another example (No. 5) of the disposition of the aperture region and the filter. In an aspect shown in FIGS. 27A and 27B, two of each of bandpass filters 36R, 36G, 36C, and 36M (a plurality of bandpass filters) having different wavelength ranges of transmitted light are mounted in a bandpass filter unit 36. The bandpass filter unit 36 has a frame 37, and the frame 37 is provided with two of each of aperture regions 37R, 37G, 37C, and 37M having different aperture shapes. The aperture regions are arranged symmetrically with respect to a centroid 37P of the frame 37. The bandpass filters 36R, 36G, 36C, and 36M have different shapes for each wavelength range, the shapes corresponding to the aperture shapes of the aperture regions 37R, 37G, 37C, and 37M. By making the shapes of the aperture regions and the bandpass filters different for each wavelength range of transmitted light in this way, the probability that the bandpass filter is mounted in an inappropriate aperture region can be reduced, and assembly can be facilitated.

As in the first embodiment, even in the case of the bandpass filter units of the aspects shown in FIGS. 23A to 27B, it is possible to suppress the image shift at the time of defocus and to acquire a multispectral image with a good image quality. The polarizing filter unit (not shown) can be used for the other examples (No. 1 to No. 5) as in the case of the first embodiment. It is desirable that the polarizing filter (not shown) mounted on the polarizing filter unit also has a disposition, shape, and size corresponding to the shapes of the aperture regions and of the bandpass filters.

Application of Present Invention

The optical element, the optical device, and the imaging apparatus according to the embodiment of the present invention can be applied to a general single-lens type or compact type digital camera, a digital camera used in a measuring device or an inspection device, and a digital camera included in a smartphone, a mobile phone, a tablet terminal, or the like.

Although the embodiment of the present invention and other examples have been described above, it is needless to say that the present invention is not limited to the aspect described above, and various modifications can be made without departing from the gist of the present invention.

EXPLANATION OF REFERENCES

1: imaging apparatus
10: imaging optical system
12: lens
16: bandpass filter unit
18: polarizing filter unit
19: frame
19A: aperture region
19B: aperture region
19C: aperture region
19D: aperture region
19G: centroid
20: frame
20G: centroid
21A: polarizing filter
21B: polarizing filter
21C: polarizing filter
21D: polarizing filter
22: bandpass filter unit
22C: bandpass filter
22G: bandpass filter
22M: bandpass filter
22R: bandpass filter
23: frame
23C: aperture region
23G: aperture region
23M: aperture region
23P: centroid
23R: aperture region
24: bandpass filter unit
25: frame
26: basic pattern
26C: bandpass filter
26G: bandpass filter
26M: bandpass filter
26R: bandpass filter
27: bandpass filter unit
27C: bandpass filter
27G: bandpass filter
27M: bandpass filter
27R: bandpass filter
28: frame
28G: centroid
30: bandpass filter unit
30C: bandpass filter
30G: bandpass filter
30R: bandpass filter
31: frame
31G: centroid
32: bandpass filter unit
32C: bandpass filter
32G: bandpass filter
32R: bandpass filter
33: frame
33G: centroid
34: bandpass filter unit
34C: bandpass filter
34G: bandpass filter
34R: bandpass filter
35: frame
35G: centroid
36: bandpass filter unit
36C: bandpass filter
36G: bandpass filter
36M: bandpass filter
36R: bandpass filter
37: frame
37C: aperture region
37G: aperture region
37M: aperture region
37P: centroid
37R: aperture region
40: light screen
40A: aperture
42: light screen
42B: aperture
44: light screen
44C: aperture
46: light screen
46D: aperture
50A: bandpass filter
50B: bandpass filter
50C: bandpass filter
50D: bandpass filter
52A: aperture region
52B: aperture region
52C: aperture region
52D: aperture region
90: subject
90B: bandpass filter
90G: bandpass filter
90M: bandpass filter
90R: bandpass filter
91: bandpass filter unit
92: frame
93: subject image
94: subject image
94B: subject image
94G: subject image
94M: subject image
94R: subject image
95: subject image
95B: subject image
95G: subject image
95M: subject image
95R: subject image
100: imaging element
110: pixel array layer
112: photodiode
120: polarizing filter element array layer
122A: polarizing filter element
122B: polarizing filter element
122C: polarizing filter element
122D: polarizing filter element
130: spectral filter element array layer
132A: spectral filter element
132B: spectral filter element
132C: spectral filter element
132D: spectral filter element
140: micro lens array layer
142: micro lens
200: signal processing unit
200A: analog signal processing unit
200B: image generation unit 200C: coefficient storage unit
1001: aperture
1001G: centroid
1002: aperture
1002G: centroid
1003: aperture
1003G: centroid
1004: aperture
1004G: centroid
1005: aperture
1005G: centroid
1006: aperture
1006G: centroid
1007: aperture
1007G: centroid
1008: aperture
1008G: centroid
1009: aperture
1009G: centroid
A: transmission wavelength characteristic
B: transmission wavelength characteristic
C: transmission wavelength characteristic
D: transmission wavelength characteristic
D1: image data
D2: image data
D3: image data
D4: image data
D5: image data
D6: image data
D7: image data
D8: image data
D9: image data
D10: image data
D11: image data
D12: image data
D13: image data
D14: image data
D15: image data
D16: image data
L: optical axis
P1: pixel
P2: pixel
P3: pixel
P4: pixel
P5: pixel
P6: pixel
P7: pixel
P8: pixel
P9: pixel
P10: pixel
P11: pixel
P12: pixel
P13: pixel
P14: pixel
P15: pixel
P16: pixel
PB: pixel block
Z1: pupil region
Z2: pupil region
Z3: pupil region
Z4: pupil region
α1: pixel signal
α2: pixel signal
α3: pixel signal
α4: pixel signal
α5: pixel signal
α6: pixel signal
α7: pixel signal
α8: pixel signal
α9: pixel signal
α10: pixel signal
α11: pixel signal
α12: pixel signal
α13: pixel signal
α14: pixel signal
α15: pixel signal
α16: pixel signal
β1: pixel signal
β2: pixel signal
β3: pixel signal
θ1: polarization direction
θ2: polarization direction
θ3: polarization direction
θ4: polarization direction
θA: polarization direction
θB: polarization direction
θC: polarization direction
θD: polarization direction
λ1: wavelength range
λ2: wavelength range
λ3: wavelength range
λ4: wavelength range

What is claimed is:

1. An optical element comprising:
a frame having a plurality of aperture regions; and
a plurality of optical filters that are mounted in the plurality of aperture regions, the plurality of optical filters including at least two types of filters having different wavelength ranges of transmitted light,
wherein the at least two types of filters are separately disposed to different aperture regions among the plurality of aperture regions, and
positions of centroids of the aperture regions are the same for the at least two types of filters, wherein a centroid of an aperture region among the aperture regions is a centroid of an image generated by the aperture region,
wherein the plurality of aperture regions have different aperture shapes for each of the wavelength ranges of the mounted optical filters, and the plurality of optical filters have different shapes for each wavelength range, the shapes corresponding to the aperture shapes.

2. The optical element according to claim 1, wherein the plurality of optical filters are mounted in aperture regions having aperture areas corresponding to the wavelength ranges.

3. The optical element according to claim 2, wherein the plurality of optical filters are mounted such that an optical filter having a longer wavelength at a center of the wavelength range is mounted in an aperture region having a larger aperture area.

4. The optical element according to claim 1, wherein
the frame has a feature point that coincides with the centroid in a case where the frame is viewed from a front, and
an aperture region has a smaller aperture area as a distance from the feature point increases.

5. The optical element according to claim 1, wherein for at least one of the wavelength ranges, a plurality of optical filters having the same wavelength range are mounted in the plurality of aperture regions, respectively.

6. The optical element according to claim 1, wherein at least one set of the plurality of optical filters has two or more types of wavelength ranges in the plurality of aperture regions.

7. The optical element according to claim 1, further comprising a plurality of polarizing filters having different polarization directions.

8. The optical element according to claim 7, wherein the polarization directions are the same for each wavelength range.

9. An optical device comprising:
the optical element according to claim 1; and
a lens that forms an optical image of a subject,
wherein the optical element is disposed at a pupil position of the lens such that the centroid coincides with an optical axis of the lens.

10. The optical device according to claim 9, further comprising:
a plurality of polarizing filters having different polarization directions,
wherein polarizing filters having the same polarization direction among the plurality of polarizing filters are disposed in the aperture regions in which optical filters having the same wavelength range are mounted.

11. The optical device according to claim 10, wherein at least one of the optical element or the plurality of polarizing filters is inserted into an optical path of light incident on the lens or is retracted from the optical path.

12. An imaging apparatus comprising:
the optical device according to claim 9;
an imaging element including a plurality of pixel groups that selectively receive light transmitted through any of the plurality of optical filters; and
a signal processing unit that generates a plurality of images corresponding to the wavelength ranges of the plurality of optical filters, respectively, based on a signal output from the imaging element.

13. The imaging apparatus according to claim 12, wherein the imaging element comprises, on a pixel, a plurality of types of optical filters having different transmission wavelength ranges and a plurality of types of polarization portions having different transmission polarization directions.

* * * * *